United States Patent
Miura et al.

(10) Patent No.: US 6,169,966 B1
(45) Date of Patent: Jan. 2, 2001

(54) APPARATUS FOR DETECTING A MOVING STATE OF AN OBJECT

(75) Inventors: Ryosuke Miura, Tama; Tadashi Masukata, Nerima-ku; Taro Shimamura, Kodaira, all of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 08/997,746

(22) Filed: Dec. 24, 1997

(30) Foreign Application Priority Data

Dec. 27, 1996 (JP) .................................................. 8-350485
Feb. 28, 1997 (JP) .................................................. 9-046180
Mar. 13, 1997 (JP) .................................................. 9-059197

(51) Int. Cl.$^7$ ..................................................... G06K 9/36
(52) U.S. Cl. ........................................... 702/142; 702/152
(58) Field of Search ........................... 702/142, 149–152, 702/3, 19; 382/106, 107

(56) References Cited

U.S. PATENT DOCUMENTS 5,067,014 * 11/1991 Bergen et al. ....................... 382/107
5,280,179 * 1/1994 Pryor et al. ......................... 250/559
5,627,905 * 5/1997 Sebok et al. ........................ 382/107

FOREIGN PATENT DOCUMENTS 5-31941   5/1993 (JP) .
7-160084  6/1995 (JP) .

* cited by examiner

*Primary Examiner*—Marc S. Hoff
*Assistant Examiner*—Craig Steven Miller
(74) *Attorney, Agent, or Firm*—Finnegan, Henderson, Farabow, Garrett, & Dunner, L.L.P.

(57) ABSTRACT

An object tracking device (1) tracks an object to find a position of the object. A first arithmetic circuit (2) calculates the variation of the position of the object with time, a second calculating circuit (3) determines a characteristic value representing the movement of the object. A third arithmetic circuit (4) determines a moving pattern of the object. A display unit (6) displays the characteristic value representing the movement of the object.

47 Claims, 31 Drawing Sheets

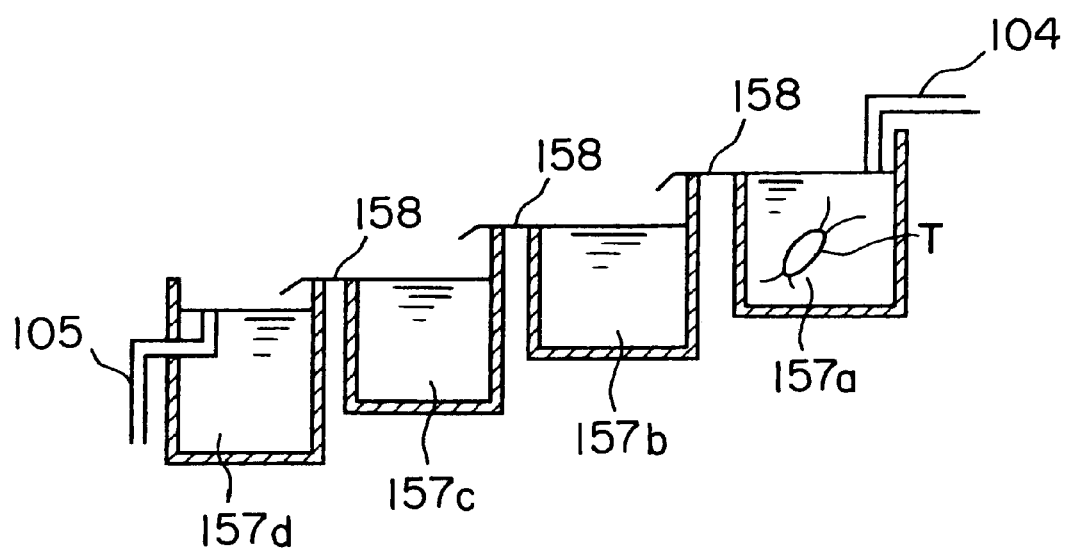
F I G. 39
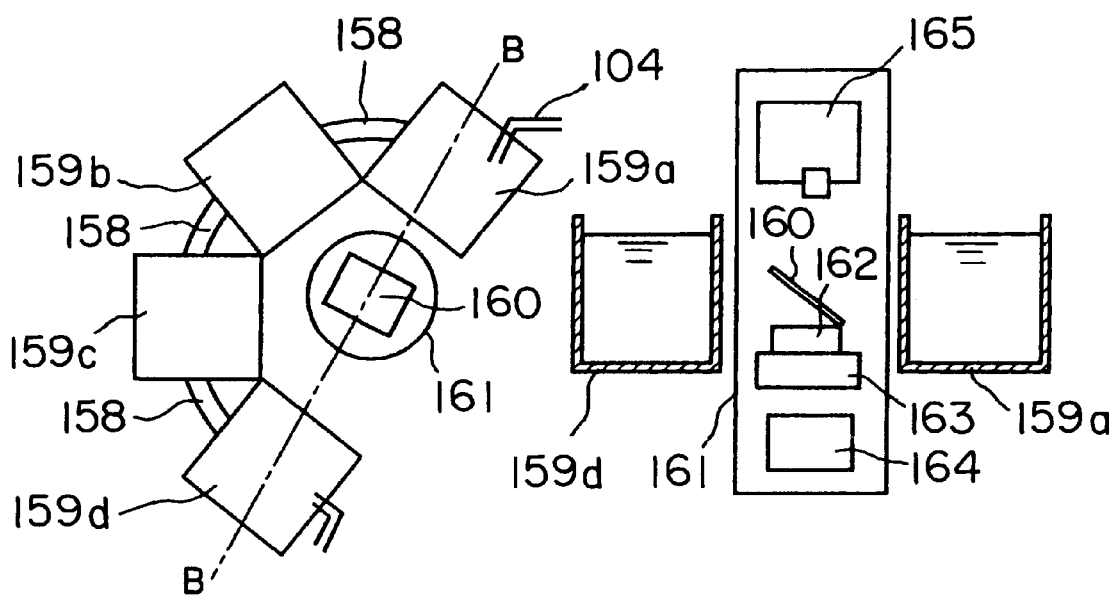
F I G. 40A   F I G. 40B

| CASE (+:ON, −:OFF) | | | | | | | | | |
|---|---|---|---|---|---|---|---|---|---|
| ELEMENT NUMBER | $C_1$ | $C_2$ | $C_3$ | $C_4$ | $C_5$ | $C_6$ | | $C_{15}$ | $C_{16}$ |
| (INPUT) ⑤(⑦) | + | + | + | + | + | + | | − | − |
| (INPUT) ①(③) | + | + | + | − | + | − | | − | + |
| (INPUT) ②(④) | + | + | − | − | − | − | | + | − |
| (INPUT) ⑥(⑧) | + | − | − | − | + | + | | + | + |
| (OUTPUT) [ACTION] HORIZONTAL DIRECTION | n | n | L | L | L | | | R | R |
| (OUTPUT) VERTICAL DIRECTION | n | n | U | U | U | | | D | D |
| (OUTPUT) ZOOMING | W | W | n | n | n | | | W | W | n : NO ACTION
L : LEFT
R : RIGHT
U : UP
D : DOWN

W: WIDE ANGLE (ZOOM OUT)
N: NARROW ANGLE (ZOOM IN)

FIG.48

APPARATUS FOR DETECTING A MOVING STATE OF AN OBJECT

TECHNICAL FIELD

The present invention relates to a moving pattern determining apparatus provided with a tracking device capable of tracking a moving object and of providing signals indicating positions of the object, and capable of accurately determining the moving pattern of the object.

RELATED ART

Tracking of a moving object flying or floating in a three-dimensional space and determining the moving pattern of the object are very important for the social and the productive activities of human beings. A previously proposed moving pattern determining apparatus for tracking an object and determining the moving pattern of the object confines the object in a limited space, such as a space defined by a drum, disposes a plurality of sets each of a light projector and a light receiver at positions on the front and the back side, of the space, and senses the movement of the object by sensing the interception of a light beam projected by each light projector by the moving object moving across a light passage between the same light projector and the corresponding light receiver.

Another previously developed moving pattern determining apparatus finds the position, moving direction, velocity and moving pattern of an object by photographing the object moving in a three-dimensional space by an ITV camera or the like, and analyzing luminance information about pictures taken by the ITV camera by an image processing device.

The movement of an object in a limited three-dimensional space can be very quickly found by the moving pattern determining apparatus provided with the plurality of sets each of the light projector and the light receiver. However, this moving pattern determining apparatus needs a very large number of sets each of a light projector and a light receiver, and an electric circuit of a very complicated configuration to measure the moving pattern accurately, and much time and labor is required for aligning the respective optical axes of the light projectors and the corresponding light receivers.

The moving pattern determining apparatus using the ITV camera needs an expensive, complicated image processing system. When determining the moving pattern of an object, digital signals obtained by converting video signals generated by the ITV camera and representing luminance information about the object by an A/D converter or the like must be given to a computer, image data abut a two-dimensional image represented by the digital signals must be stored in an image storage device, and the image data read from the image storage device must be subjected to many image processing processes including a binary coding process, a ternary coding process, a calculation of the moving velocity of the center of gravity and such. The computer needs much time for writing image data to and reading image data from the image storage device, and carrying out the image processing processes. Accordingly, it is difficult to find the minute movement of the object accurately. Thus, the moving pattern of the detected object cannot be accurately determined in a short time by the conventional techniques. Therefore, determining the moving pattern of an object needs a long time because image data and data obtained by analyzing images must be accumulated and those data must be analyzed by a statistical method.

DISCLOSURE OF THE INVENTION

The present invention has been made in view of the foregoing problems and it is therefore an object of the present invention to provide a moving mode determining apparatus for determining the moving pattern of a moving object, capable of accurately specifying the movement of the object in a short time.

A moving pattern determining apparatus according to the present invention comprises: an object tracking means which tracks a moving object and provides position signals indicating positions of the object; a positional time-variation calculating means for calculating positional time-variations of the object, a moving characteristic calculating means for calculating the moving characteristic of the object on the basis of signals provided by the positional time-variation calculating means; and a moving pattern calculating means for calculating the moving pattern of the object on the basis of signals provided by the moving characteristic calculating means.

According to the present invention, the moving velocity (x', y') or $[r']=\{x'(t)^2+y'(t)^2\}^{1/2}$ of the object is determined from a position signal (x, y) provided by the object tracking means, and then the acceleration (x", y") or [r"] of the object, i.e., a rate of change of the position of the object with respect to time. The moving characteristic of the object is determined by using the positional time-variations of the object, and a mathematical model expressing the sum of the weighted velocity and acceleration, a dynamic model of the object for explaining positional time-variations of the object from changes of components of the object relative to each other, a two-dimensional pattern formed by eliminating the time elements of two predetermined positional time-variations, a predictive expression obtained by the regression analysis of predetermined time of positional time-variations, a predictive expression obtained by the learning of the variation of predetermined time with time or errors between frequency components determined through the harmonic analysis of positional time-variations of a predetermined time. The moving pattern of the object is decided on the basis of the thus determined characteristic values representing the movement of the object.

A moving pattern determining apparatus according to the present invention comprises: a plurality of water tanks sequentially arranged along a flowing direction and connected to each other; an object tracking means which follows the movements of objects in the water tanks at an upstream position and a downstream position, and provides signals indicating positions of the objects; a positional time-variation calculating means which calculates positional time-variations of the objects in the water tanks at the upstream and the downstream position on the basis of signals provided by the object tracking means; a characteristic value calculating means which calculates characteristic values representing the movements of the objects in the water tanks at the upstream and the downstream position on the basis of signals provided by positional time-variation calculating means; and a moving pattern determining means which determines moving patterns of the objects from the characteristic values representing the movements of the objects in the water tanks at the upstream and the downstream position on the basis of signals provided by the characteristic value calculating means.

According to the present invention, the positions of the objects in the water tanks at the upstream and the downstream position are determined by the object tracking means, and the positional time-variations of the object in the water tanks at the upstream and the downstream position are determined by the positional time-variation calculating means. The characteristic values representing the movements of the objects in the water tanks at the upstream and the downstream position are calculated by the characteristic value calculating means, and moving patterns of the objects is determined by the moving pattern determining means.

A moving pattern determining apparatus according to the present invention comprises: a stage means which is capable of optionally changing its attitude relative to an object and of receiving a wave generated by the object; a wave receiving means which is storing a plurality of pieces of position information about the positions of the object and is capable of sequentially providing position information signals in response to the reception of a signal representing the wave generated by the object from the stage means; a stage control means which is storing values of a manipulated variable for the attitude control of the stage means, corresponding to the plurality of pieces of position information, gives a control signal corresponding to a value of a manipulated variable to the stage means upon the reception of a position information signal from the wave receiving means to achieve the optimum attitude control of the stage means relative to the object; a movement calculating means which receives a displacement by which the stage means is shifted under the control of the stage control means and calculates the movement of the object; and a moving characteristic determining means which is storing moving characteristic information about the movement of the object beforehand and determines the moving characteristic of the object on the basis of the moving characteristic information and the result of calculation made by the movement calculating means.

The stage means may be provided with a rotating mirror which receives a wave generated by the object and reflects the wave in a predetermined direction, and an angular position control means for controlling the angular position of the rotating mirror.

The rotating mirror may be a flat mirror.

The rotating mirror may be a spherical mirror.

The rotating mirror may consist of two rotating mirrors respectively having axes of rotation substantially perpendicularly intersecting each other.

The stage means may be provided with a spherical mirror supported on one end of a rotating shaft supported on a spherical support, receiving a wave generated by the object and reflecting the wave in a predetermined direction, a tilt actuator attached to the other end of the rotating shaft to control a first angular position of the rotating shaft in a first plane, and a pan actuator attached to the other end of the rotating shaft to control a second angular position of the rotating shaft in a second plane intersecting the first plane.

The wave receiving means comprises a converging device which receives and converges the wave generated by the object and sent thereto from the stage means, a wave receiving device comprising a plurality of image sensing elements which convert an image of the wave converged by the converging device into an electrical signal corresponding to the intensity of the wave, and a converting device which subjects the electrical signals given thereto by the image sensing elements of the wave receiving device to A/D conversion using a predetermined threshold and provides on/off electric signals produced by A/D conversion as the position information signals.

The converging device may be either an optical lens having fixed focal length or an optical zoom lens having adjustable focal length.

The image sensing elements of the wave receiving device may be divided into those of a first group disposed in a central region of a converging surface on which the image of the wave is converged by the converging device, and those of a second group disposed in a region of the converging surface around the central region in which the image sensing elements of the first group are disposed.

The image sensing elements of the first and the second group include those which are arranged at least horizontally and vertically on the converging surface.

The image sensing elements of the wave receiving device may be photodiodes sensitive to at least one of visible light, ultraviolet light, infrared light and laser light.

The converting device comprises an analog amplifying circuit for amplifying an electric signal received from the wave receiving device, and an A/D converter provided with an input terminal to which a predetermined threshold specifying a lower limit for an amplified electric signal provided by the analog amplifying circuit can be applied.

The stage control means may be provided with a logic table of values of a manipulated variable corresponding to a plurality of pieces of position information indicating positions of the object, and control signals corresponding to position information signals sequentially given thereto by the wave receiving device may be determined by using the logic table.

The stage control means may be provided with a logic table of values of a manipulated variable corresponding to the results of detection made by the horizontally arranged image sensing elements and values of a manipulated variable corresponding to the results of detection made by the vertically arranged image sensing elements, and the wave receiving means may determine control signals corresponding to position information signals sequentially given thereto by the wave receiving means by using the logic table.

The logic table may also contain values of a manipulated variable for the converging device of the wave receiving means, and the stage control means may control the stage means in addition to the converging device.

The movement calculating means may calculate a movement of the moving object on the basis of an angular displacement of the rotating mirror.

The movement calculating means may calculate both a horizontal movement and a vertical movement.

A moving pattern determining apparatus according to the present invention comprises: a wave receiving means which receives a wave generated by an object and provides sequentially position information signals indicating positions of the object; a movement calculating means which calculates movements of the object on the basis of the position information signals received from the wave receiving means; and a moving characteristic determining means which stores moving characteristic information about the moving characteristic of the object beforehand and determines the moving characteristic of the object on the basis of the moving characteristic information and the results of calculation carried out by the movement calculating means.

The wave receiving means may comprise a wave receiving device having a horizontal row of a plurality of image sensing elements and a vertical row of a plurality of image sensing elements, and a converter which receives electric signals from the horizontal and the vertical row of image sensing elements and provides the position information signal indicating the position of the image sensing element which provided the electric signal corresponding to the highest wave intensity.

The movement calculating means may calculate a direction from which the wave generated by the object is received and a movement of the object on the basis of the number of movement per unit time of the image sensing elements which have provided electric signals corresponding to the highest wave intensity.

The moving characteristic determining means may comprise a unit measure converting circuit which converts the movement calculated by the movement calculating means into a predetermined unit measure, a characteristic pattern storage circuit which stores predetermined characteristic patterns as the moving characteristic information, and a matching circuit which receives a movement converted by the unit measure converting circuit, compares the moving pattern of the object with the characteristic patterns stored in the characteristic pattern storage circuit, and provides a signal indicating the number of the characteristic pattern matched with the moving pattern of the object.

The unit measure converting circuit calculates the geometric mean $\Delta z$ of a horizontal displacement $\Delta x$ of the object and a vertical displacement $\Delta y$ of the object as a unit measure.

The unit measure converting circuit may calculate the ratio $\Delta R$ between a horizontal displacement $\Delta x$ of the object and a vertical displacement $\Delta y$ of the object as a unit measure.

The unit measure converting circuit may calculate the difference geometric mean $\nabla Z$ of the respective differences $\nabla x$ and $\nabla y$ between two successive horizontal displacements $\Delta x$ of the object and between two successive vertical displacements $\Delta y$ of the object as the unit measure.

The unit measure converting circuit may calculate the geometric mean $\Delta E$ of the two differences between three successive calculated horizontal displacements $\Delta x$ of the object and the two differences between three successive calculated vertical displacements $\Delta y$ of the object.

The characteristic pattern storage circuit stores, as the characteristic patterns, a plurality of logical expressions which express values in a region between a predetermined upper limit and a predetermined lower limit which are defined by the unit measure calculated by the unit measure converting circuit in positive values and expresses values outside the region in negative values, and the matching circuit decides whether or not a calculated value calculated by the unit measure converting circuit is applicable to the logical expression, and provides the contents of the logical expression as a moving characteristic.

The moving characteristic determining means is provided with a display means which generates or displays an alarm when the moving characteristic determining means decides that the moving characteristic of the object is abnormal.

BRIEF DESCRIPTION OF THE DRAWINGS

FIG. 39 is a typical view of water tanks in a modification;

FIG. 40A is a typical plan view of water tanks and an object tracking device in a modification;

FIG. 40B is a typical sectional view taken on line B—B in FIG. 40A;

FIG. 48 is a diagram of assistance in explaining the contents of a logical table employed in the moving object detecting apparatus of FIG. 47;

DESCRIPTION OF THE PREFERRED EMBODIMENTS

Preferred embodiments of the present invention will be described hereinafter with reference to the accompanying drawings.

First Embodiment

Embodiment 1-1

(FIGS. 1 to 5)

Figure 1:
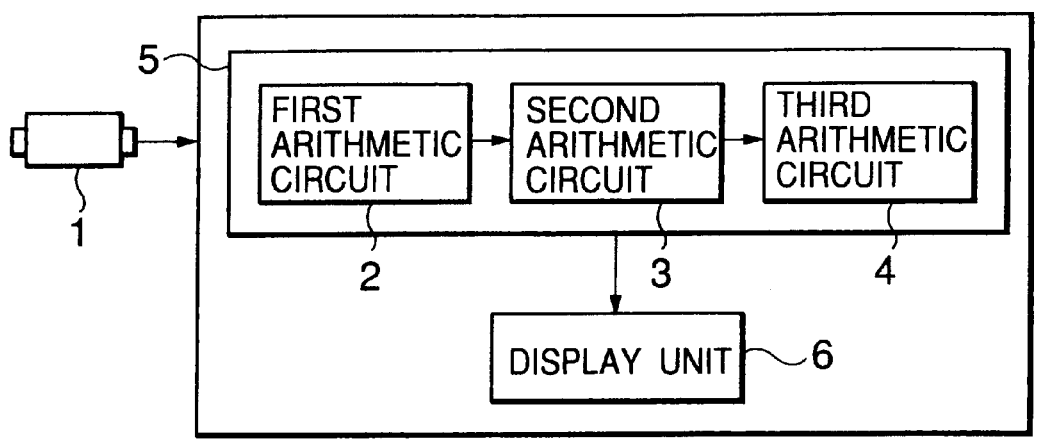
FIG. 1 is a block diagram of a moving pattern determining apparatus in an embodiment 1-1 according to the present invention.

Referring to FIG. 1, a moving pattern determining apparatus has an object tracking device 1, such as a video camera, which tracks a moving object, not shown, to find positions of the object and provides position signals indicating positions of the object. a first arithmetic circuit (positional time-variation calculating means) 2 connected to the object tracking device 1 to calculate the positional time-variation of the object, a second calculating circuit (characteristic value calculating means) 3 connected to the first arithmetic circuit 2, and a third arithmetic circuit (moving pattern calculating means) 4 connected to the second arithmetic circuit 3 to determine a moving pattern of the object. The first arithmetic circuit 2, the second arithmetic circuit 3 and the third arithmetic circuit 4 constitute a moving pattern determining unit 5. A display unit 6 is connected to the moving pattern determining unit 5.

The operation of the embodiment 1-1 will be described hereinafter. As shown in FIG. 1, the object tracking device 1 finds a position of the object and gives a position signal (x, y) indicating the position of the object to the fist arithmetic circuit 2 and the display unit 6.

Figure 2:
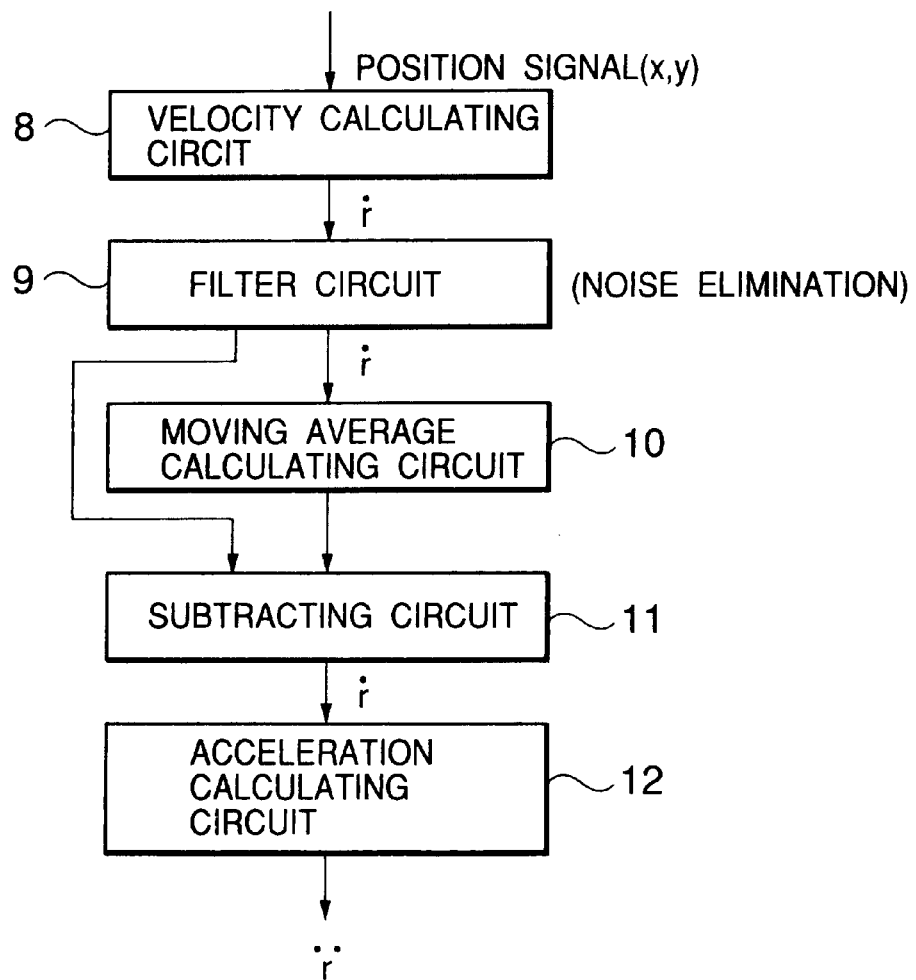
FIG. 2 is a flow chart of assistance in explaining the operation of a first arithmetic circuit.

The first arithmetic circuit 2 executes an arithmetic operation shown in FIG. 2 in a flow chart. Referring to FIG. 2, a velocity calculating circuit 8 calculates a velocity r' by using Expressions (1-1), (1-2) and (1-3).

$$x'=DIF[x] \quad (1\text{-}1)$$

$$y'=DIF[y] \quad (1\text{-}2)$$

$$r'=SQR[x'^2+y'^2] \quad (1\text{-}3)$$

where DIF[ ] signifies the operation of a differentiator, and SQR[ ] signifies the operation of a square root calculator.

In the first arithmetic circuit 2, a low-pass filter included in a filter circuit 9 eliminates noise from the velocity r', a moving average calculating circuit 10 calculates a moving average and provides a moving average signal, a subtracting circuit 11 calculates the difference between the moving average signal and the velocity r', and an acceleration calculating circuit 12 calculates an acceleration r", i.e., a rate of change of the velocity r' with respect to time, by using:

$$r''=DIF[r'] \quad (1\text{-}4)$$

Figure 3:
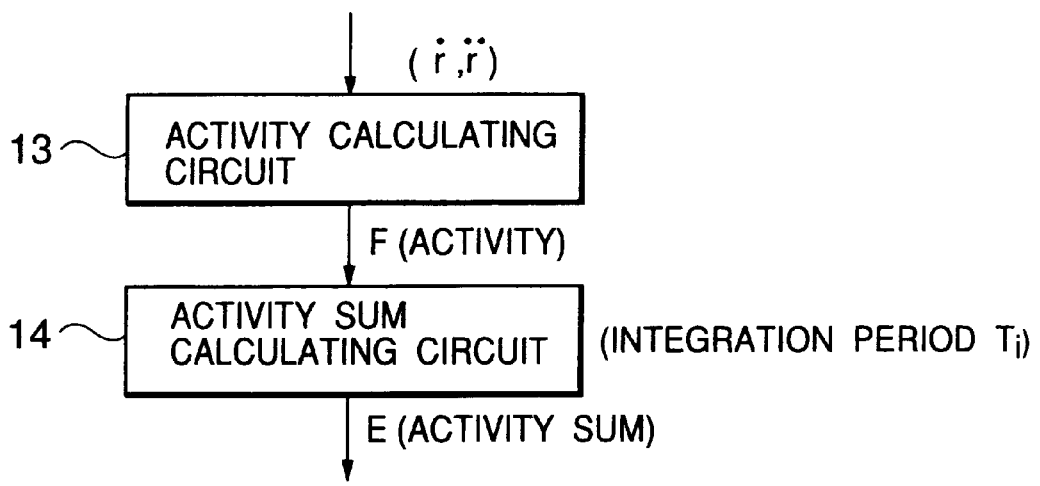
FIG. 3 is a flow chart of assistance in explaining the operation of a second arithmetic circuit.
Figure 4:
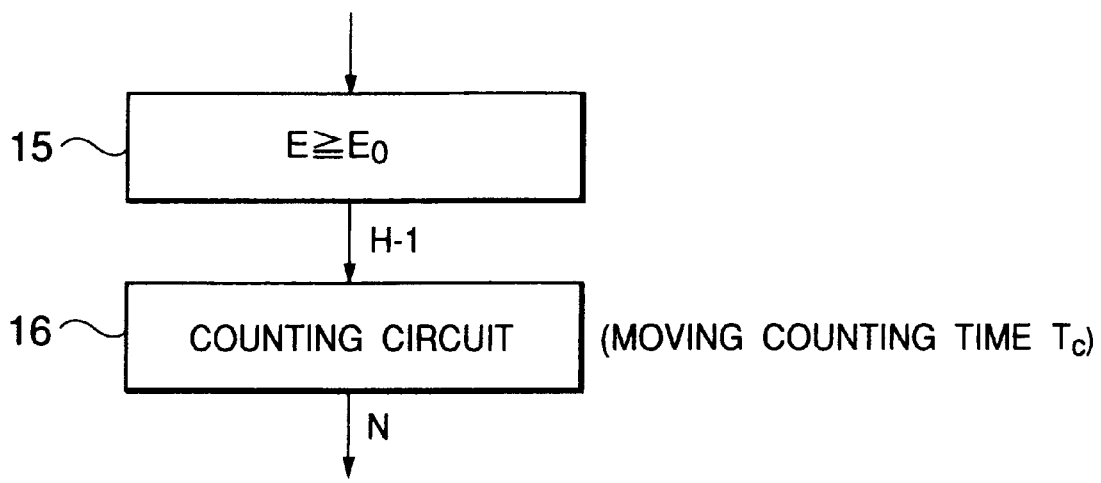
FIG. 4 is a flow chart of assistance in explaining the operation of a third arithmetic circuit.
Figure 5:
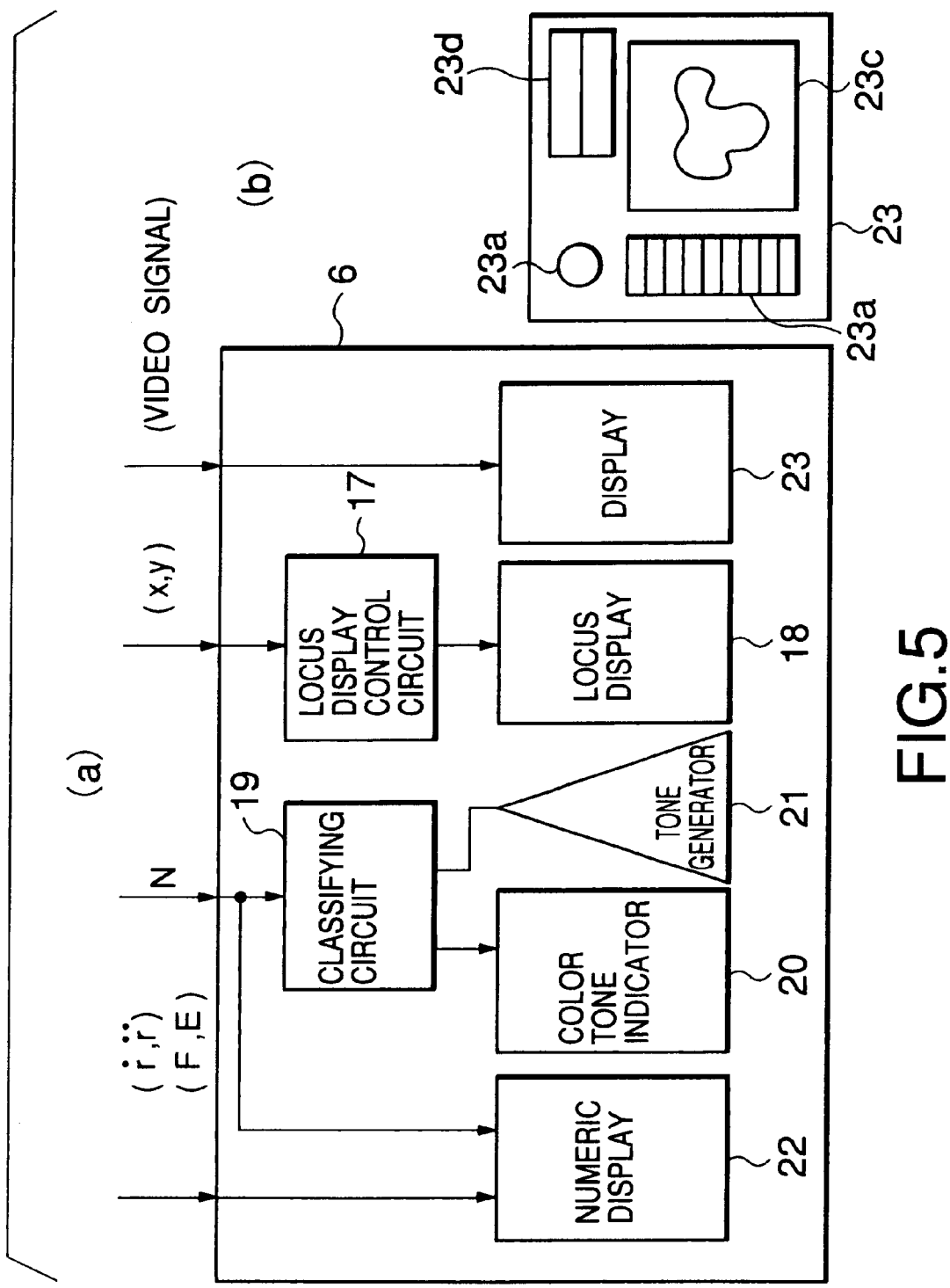
FIG. 5 is a block diagram of a display unit.

The second arithmetic circuit 3 receives signals indicating the velocity r' and the acceleration r", and executes an operation shown in FIG. 3 to obtain a characteristic value E. An activity calculating circuit 13 and an activity sum calculating circuit 14 operates the velocity r' and the acceleration r" to calculate the characteristic value E by using:

$$F=a \cdot ABS[r''] + b \cdot MLT[r'] \quad (1\text{-}5)$$

$$E=INT[F]^{Ti} \quad (1\text{-}6)$$

where ABS[ ] signifies the operation of a rectifier, MLT[ ] signifies the operation of a square calculator, INT[ ] signifies the operation of an integrator, a and b are weighting constant, and $T_i$ indicates a period of integration of the integrator. An activity F expressed by Expression (1-5) is the sum of the weighted square of the velocity r' and the weighted acceleration r", and is a relative quantity of the same dimension as the quantity of heat of movement of the object. The weighting constants a and b are those meeting conditions determined by the mutual relation ship between conditions of an environment in which the object moves, and the movement of the object. The weighting constants a and b are empirical values used for correction to equalize the respective contributions of acceleration and velocity of the value F calculated by using Expression (1-5). The characteristic value E is obtained by integrating the activity F with respect to time and indicates the sum of activities in the integration period $T_i$.

In the third arithmetic circuit 4, a comparator 15 compares the characteristic value E calculated in an integration period $T_i$ by the second calculating circuit 3 with a predetermined value $E_0$. The comparator 15 generates a pulse signal +1 if $E>E_0$, A counting circuit 16 counts the output pulse signals of the comparator 15, and provides a count N of the pulse signals counted in a moving counting time $T_c$.

As shown in FIGS. 5(a) and 5(b), the display unit 6 receives the position signal (x, y) provided by the object tracking device 1, signals indicating the velocity r' and acceleration r" and provided by the first arithmetic circuit 2, the activity F and the characteristic value E provided by the second calculating circuit 3, and the count N provided by the third arithmetic circuit 4, and displays data. The display unit 6 has a locus display control circuit 17 for displaying loci of the moving object indicated by the position signals (x, y) provided in a display time, a locus display 18 for displaying the output of the locus display control circuit 17, a classifying circuit 19 for classifying counts provided by the third arithmetic circuit 4, a color tone indicator 20 for displaying a class value provided by the classifying circuit 19, a tone generator 21 for generating a tone corresponding to the class value, a numeric display 22 for displaying the velocity r' the acceleration r", the activity F and the characteristic value E provided by the moving pattern determining unit 5, and a display for displaying images provided by the object tracking device 1, such as a video camera, or another video camera. The display 23 has a characteristic value display unit 23a for displaying a characteristic value representing the movement of the object provided by the second arithmetic circuit 3, a decision display unit 23b for displaying a decision made by the third arithmetic circuit 4, an object display unit 23c for displaying the movement of the object, and a position display unit 23d for displaying the positions (x, y) of the object. The display units 23a, 23b, 23c and 23d display necessary data.

Embodiment 1-2

Figure 6:
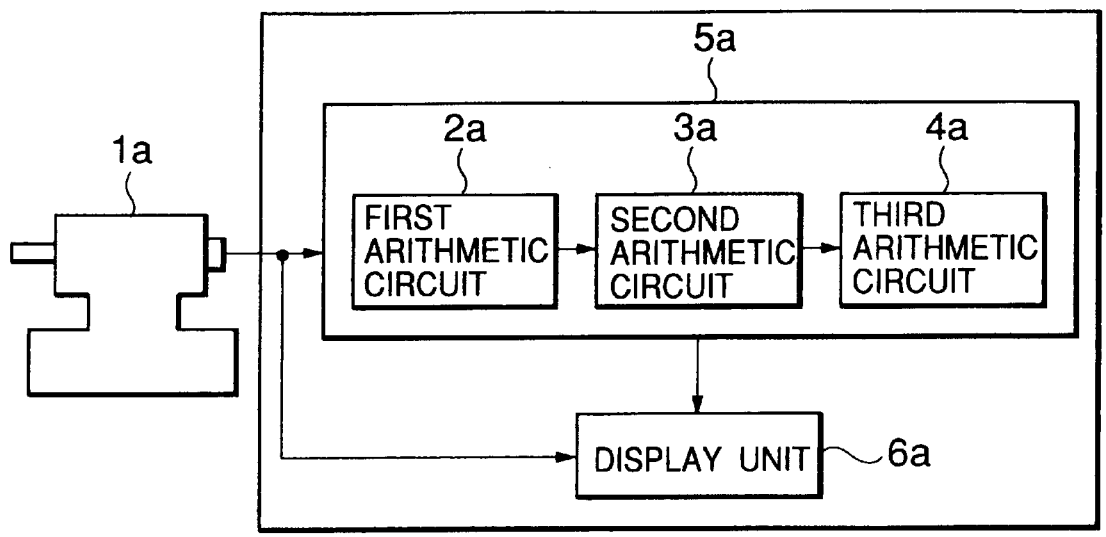
FIG. 6 is a block diagram of a moving pattern determining apparatus in an embodiment 1-2 according to the present invention.

FIG. 6 shows a moving pattern determining apparatus in a embodiment 1-2 according to the present invention. As shown in FIG. 6, the moving pattern determining apparatus employs, as an object tracking device 1a, a tracking video camera provided with a camera unit capable of being automatically turned in a horizontal plane and being automatically tilted in a vertical plane for panning. The object tracking device 1a is able to be directed minutely toward a desired local region in a field of view for tracking. A moving pattern determining unit 5a formed by sequentially connecting a first arithmetic circuit 2a, a second arithmetic circuit 3a and a third arithmetic circuit 4a is connected to the object tracking device 1a. A display unit 6a is connected to the moving pattern determining unit 5a.

In FIG. 6, a position signal (x, y) indicating a position of an object provided by the object tracking device 1a is given to the first arithmetic circuit 2a and the display unit 6a.

Figure 7:
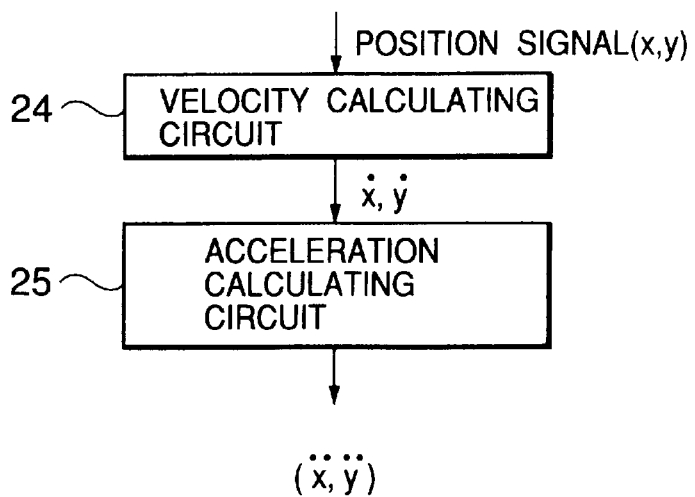
FIG. 7 is a flow chart of assistance in explaining the operation of a first arithmetic circuit.

The first arithmetic circuit 2a executes an operation shown in FIG. 7 in a flow chart. As shown in FIG. 7, a velocity calculating circuit 24 calculates velocities x' and y', i.e., rate of change of the coordinates of the position of the object with respect to time, by using Expressions (1-1)' and (1-2)'.

$$x'=\text{DIF}[x(t)] \qquad (1\text{-}1)'$$

$$y'=\text{DIF}[y(t)] \qquad (1\text{-}2)'$$

where DIF[ ] signifies the differentiating operation of a differentiator. In the first arithmetic circuit 2a, an acceleration calculating circuit 25 eliminates noises from the velocities x' and y' by a low-pass filter, and calculates accelerations x" and y" by using Expressions (1-7) and (1-8).

$$x''=\text{DIF}[x'] \qquad (1\text{-}7)$$

$$y''=\text{DIF}[y'] \qquad (1\text{-}8)$$

The second arithmetic circuit 3a receives the velocities x' and y' and the accelerations x" and y" calculated by the first arithmetic circuit 2a together with the position signal (x, y).

Figure 8:
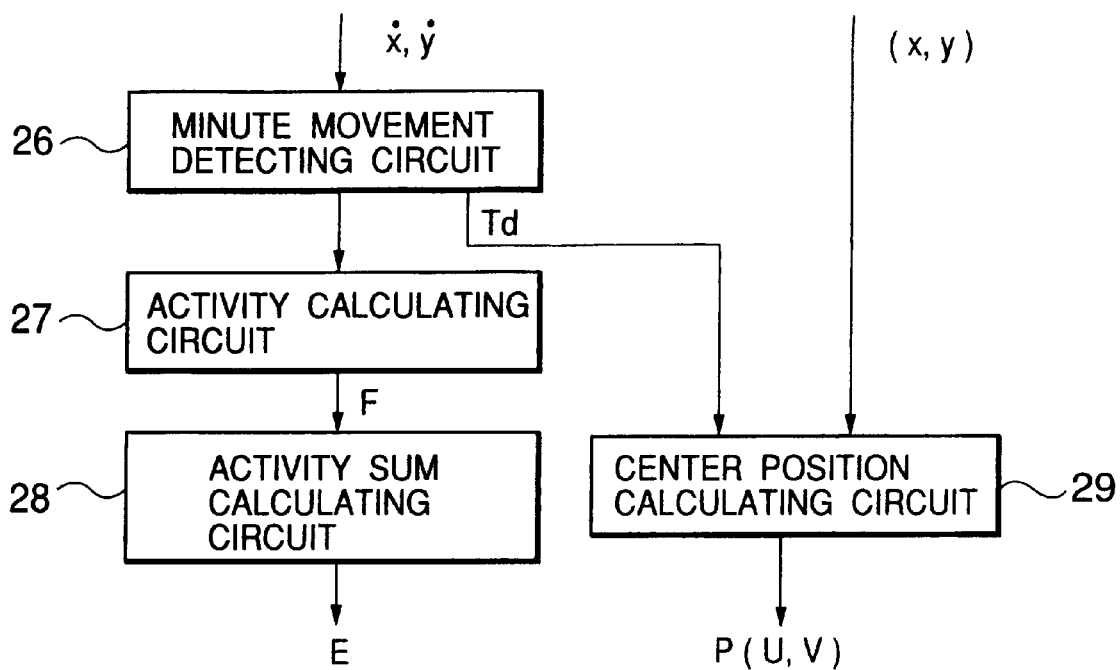
FIG. 8 is a flow chart of assistance in explaining the operation of a second arithmetic circuit.
Figure 9:
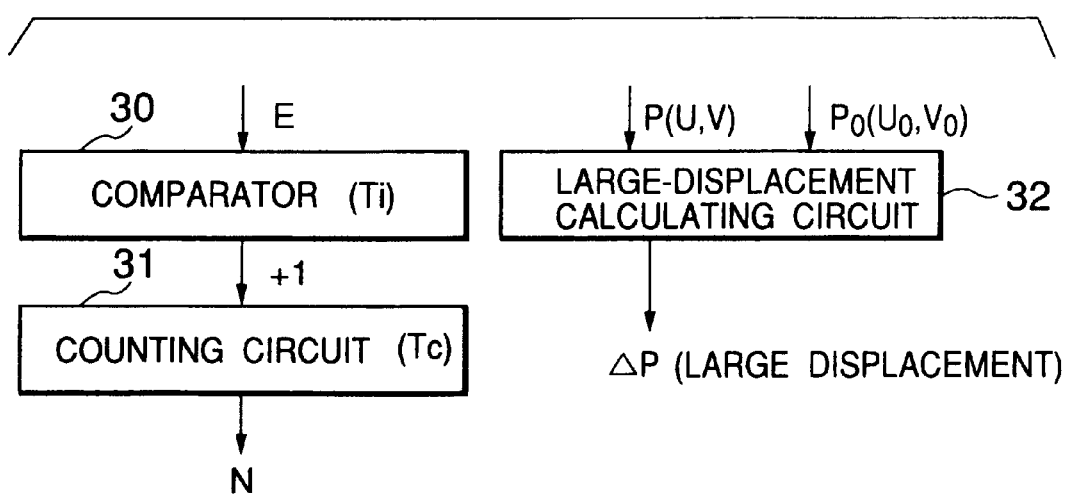
FIG. 9 is a flow chart of assistance in explaining the operation of a third arithmetic circuit.

Then, an operation shown in FIG. 8 is executed to obtain a characteristic value E and a center P of minute movement. Referring to FIG. 8, a minute movement detecting circuit 26 determines minute movement starting time and minute movement terminating time by using the velocities x' and y', Expressions (1-9) and (1-10), and Logical expressions (1-11) and (1-12).

$$X=\text{INT}[x'] \qquad (1\text{-}9)$$

$$Y=\text{INT}[y'] \qquad (1\text{-}10)$$

$$(X \text{ AND } Y) < M_{XY} \qquad (1\text{-}11)$$

$$(X \text{ OR } Y) > M_{XY} \qquad (1\text{-}12)$$

where $M_{XY}$ is a predetermined value relating to a region for minute movement and dependent on the movement of the object. A timer included in the minute movement detecting circuit 26 times a stay time $T_d$ between the start and the termination of the minute movement. Upon the detection of the start of the minute movement by the minute movement detecting circuit 26, an activity calculating circuit 27 and an activity sum calculating circuit 28 shown in FIG. 8 start operating to determine an activity F and activity sum E, i.e., characteristic values, by using Expression (1-13) representing a dynamic model and Expression (1-14).

$$F=Ax''+By''+Cx'y' \qquad (1\text{-}13)$$

$$E=\text{INT}[F]^{Td} \qquad (1\text{-}14)$$

where $\text{INT}[\ ]^{Td}$ signifies the operation of an integrator for integrating the stay time $T_d$, and A, B and C are predetermined weighting constants. Activity F expressed by Expression (1-13) is the sum of weighted accelerations x" and y", and a weighted product of velocities x' and y'. The activity F is a relative quantity of the same dimension as the quantity of heat of movement of the object. The weighting constants A, B and C are empirical values meeting conditions determined by the mutual relationship between the environmental conditions of a gravitational field in which the object moves and the movement of the object, and used for equalizing the respective contributions of the right-hand terms of Expression (1-13) to the activity F. The characteristic value E is obtained by integrating the activity F with respect to time, and is equal to the sum of activities of the minute movement of the object in the stay time $T_d$.

In the second arithmetic circuit 3a, a center position calculating circuit 29 receives the stay time $T_d$ and the position signal (x, y) provided by the tracking device 1a, and calculates the center P (v, h) of minute movement of the object by using Expressions (1-15) and (1-16).

$$v=\text{INT}[x]T_d/T_d \qquad (1\text{-}15)$$

$$h=\text{INT}[y]T_d/T_d \qquad (1\text{-}16)$$

In the third arithmetic circuit 4a, a comparator 30 compares the activity sum E provided by the second arithmetic circuit 3a with a predetermined value $E_0$ every predetermined period $T_i$ and generates a pulse of +1 if $E>E_0$.

A counting circuit 31 counts the pulses generated by the comparator 30 and provides the number N of the pulses counted in a moving counting time $T_c$. In the third arithmetic circuit 4a, a large-displacement calculating circuit 32 calculates a large displacement ΔP using a center $P(v_0, h_0)$ of minute movement of the object and a center P(v, h) of minute movement of the object subsequent to the former minute movement.

$$\Delta P = P(v, h) - P(v_0, h_0) = P(v - v_0, h - h_0) \tag{1-17}$$

The display unit 6a receives the position signal (x, y) provided by the object tracking device 1a, the speed (x', y') and the acceleration (x", y") provided by the first arithmetic circuit 2a, the activity F and the activity sum E provided by the second arithmetic circuit 3a, the count N, the center P of minute movement and the displacement ΔP provided by the third arithmetic circuit 4a, and displays the following data.

Figure 10:
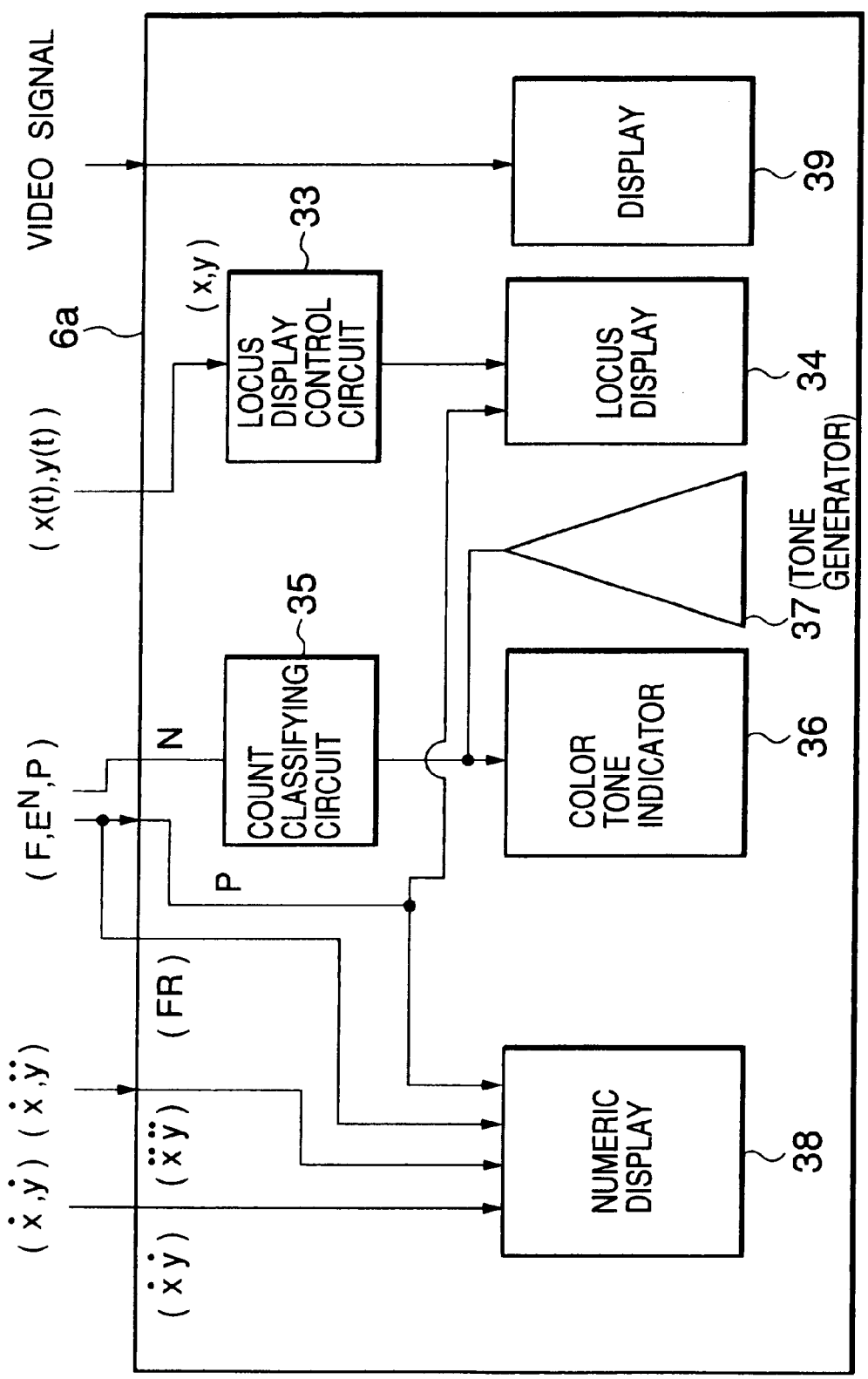
FIG. 10 is a block diagram of a display unit.

As shown in FIG. 10, the display unit 6a has a locus display control circuit 33 for displaying loci of the moving object indicated by the position signals (x, y) provided in a predetermined time, a locus display 34 for displaying the output of the locus display control circuit 33 and the center of minute movement of the object, a classifying circuit 35 for classifying counts N, a color tone indicator 36 for displaying a class value according to a value provided by the classifying circuit 35, a loudspeaker 37, a numeric display 38 for displaying the velocity, the acceleration, the activity and the activity sum provided by the moving pattern determining unit 5a, and a display 39 for displaying images provided by the object tracking device 1a, such as a video camera, or another video camera. The displays 38 and 39 display necessary data.

Embodiment 1-3

Figure 11:
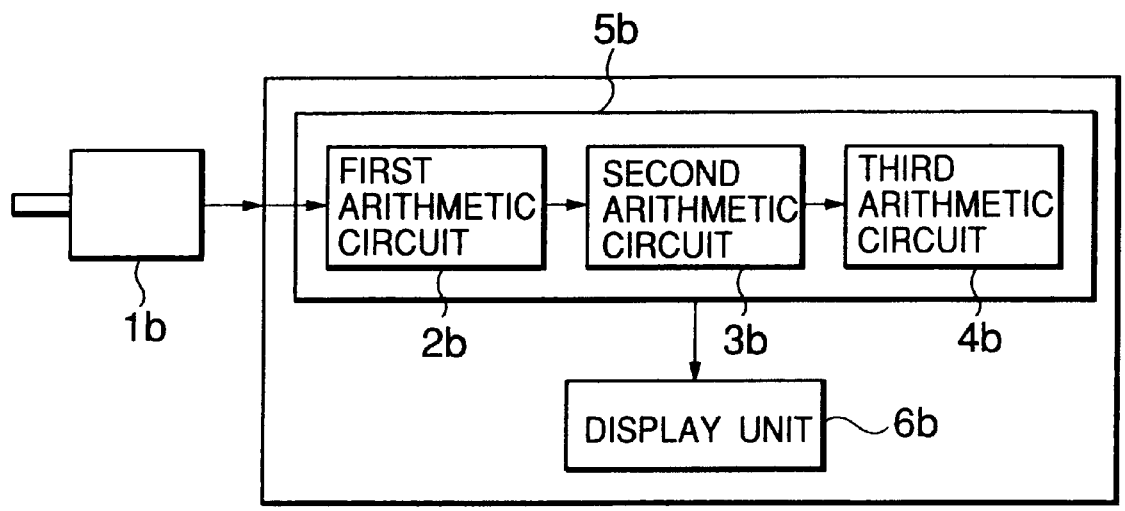
FIG. 11 is a block diagram of a moving pattern determining apparatus in an embodiment 1-3 according to the present invention.

Referring to FIG. 11 showing a moving pattern determining apparatus in an embodiment 1-3 according to the present invention, the moving pattern determining apparatus employs a tracking video camera as an object tracking device 1b and is applied to determining moving patterns of a plurality of freely moving objects affecting each other on a reciprocal basis. The object tracking device 1b is connected to a moving pattern determining unit 5b comprising a first arithmetic circuit 2b, a second arithmetic circuit 3b and a third arithmetic circuit 4b, which are connected sequentially. A display unit 6b is connected to the moving pattern determining unit 5b.

Figure 12:
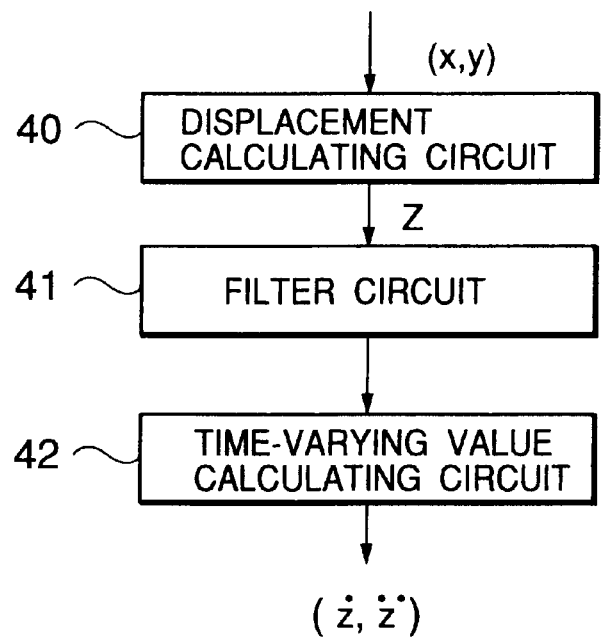
FIG. 12 is a flow chart of assistance in explaining the operation of a first arithmetic circuit.

Referring to FIG. 11, the object tracking device 1b gives a position signal (x, y) indicating a position of the object to the first arithmetic circuit 2b. The first arithmetic circuit 2b executes an operation shown in FIG. 12. A displacement calculating circuit 40 processes the position signal (x, y) by using Expressions (1-18), (1-19) and (1-20) to obtain a displacement z.

$$X = \text{MLT}[x] \tag{1-18}$$

$$Y = \text{MLT}[y] \tag{1-19}$$

$$z = \text{SQR}[X+Y] \tag{1-20}$$

where MLT[ ] signifies the operation of a square calculator and SQR[ ] signifies the operation of a square root calculator. A low-pass filter included in a filter circuit 41 eliminates noises from the displacement z, and a time-varying value calculating circuit 42 calculates a velocity z' and an acceleration z".

$$z' = \text{DIF}[Z] \tag{1-21}$$

$$z'' = \text{DIF}[z'] \tag{1-22}$$

Figure 13:
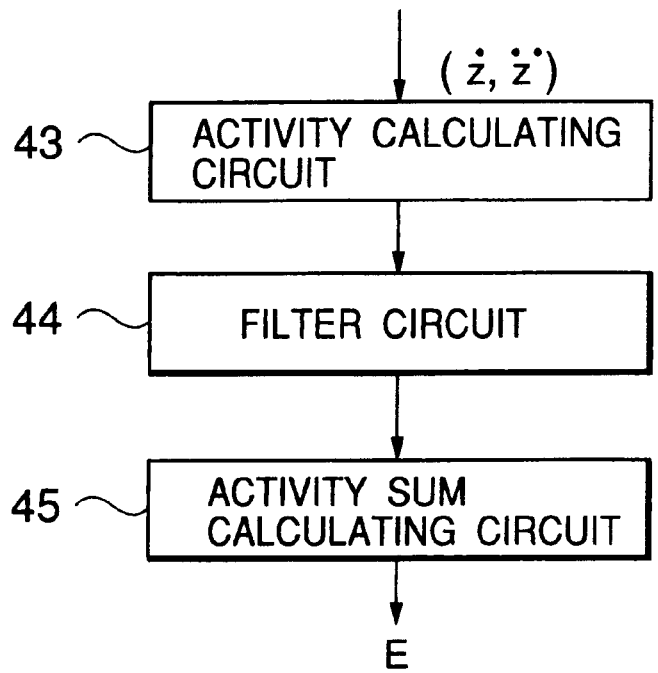
FIG. 13 is a flow chart of assistance in explaining the operation of a second arithmetic circuit.

The second arithmetic circuit 3b receives the velocity z' and the acceleration z" calculated by the first arithmetic circuit 2b, and executes an arithmetic operation shown in FIG. 13 to calculate a characteristic value E. An activity calculating circuit 43 calculates an activity F by using Expression (1-23)

$$F = a \cdot z'' + b \cdot z'^2 \tag{1-23}$$

A high-pass filter included in a filter circuit 44 eliminates higher harmonics from the activity F, and an activity sum calculating circuit 45 calculates an activity sum E in a predetermined time $T_s$ by using Expression (1-24).

$$E = \text{INT}[F]^{T_s} \tag{1-24}$$

where $\text{INT}[\ ]^{T_s}$ signifies an integrating operation in the predetermined time $T^s$, and a and b are weighting constants. The activity F expressed by Expression (1-23) is the sum of the weighted acceleration z" and the weighted square of the velocity $z'^2$ and is a relative value of the same dimension as the quantity of heat of movement of the object. The weighting constants a and b are those determined empirically and used for equalizing the respective contributions of the square of the velocity $z'^2$ and the acceleration z" to the activity F. The filter circuit 44 employs a bypass filter which performs harmonic analysis for frequency decomposition.

Figure 14:
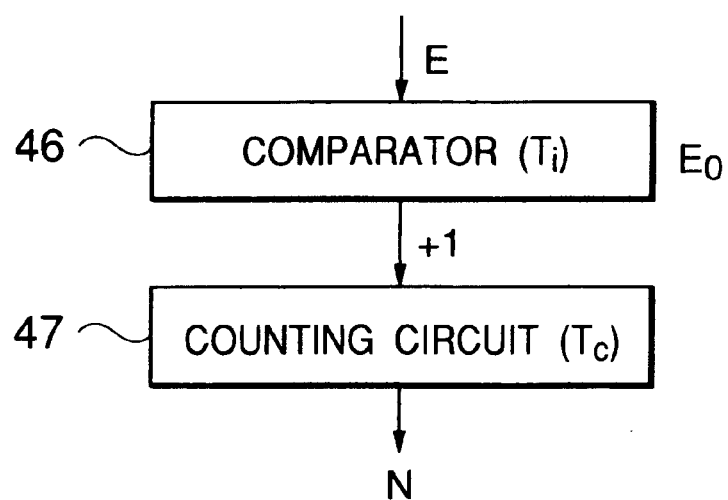
FIG. 14 is a flow chart of assistance in explaining the operation of a third arithmetic circuit.

In the third arithmetic circuit 4b, a comparator 46 (FIG. 14) compares the activity sum E provided by the second arithmetic circuit 3b with a predetermined value $E_0$ every predetermined period $T_i$ and generates a pulse of +1 if $E > E_0$. A counting circuit 47 counts the pulses generated by the comparator 46 and provides the number N of the pulses counted in a moving counting time $T_c$.

Figure 15:
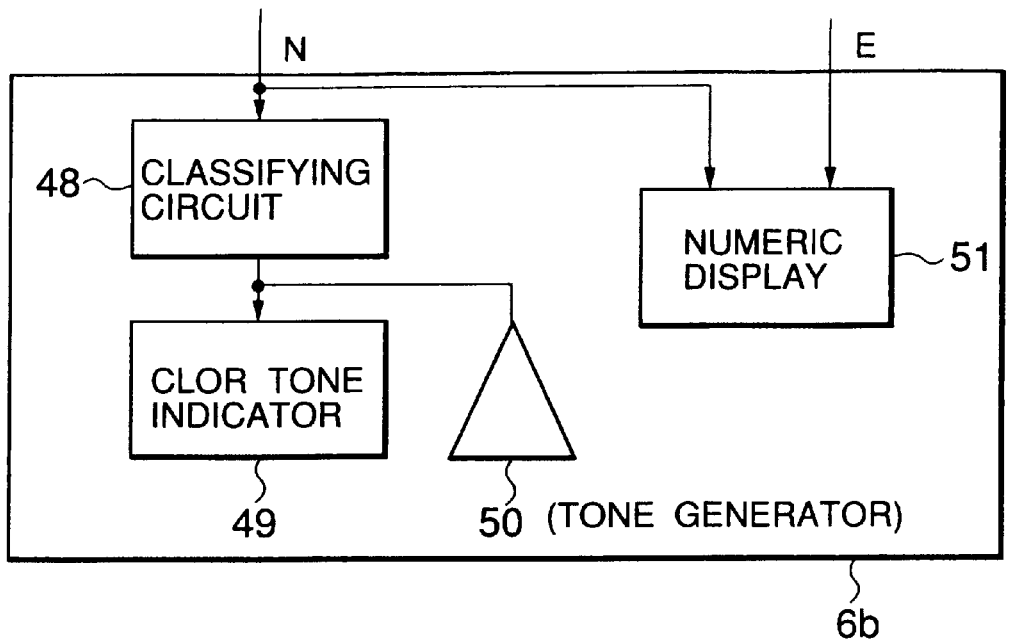
FIG. 15 is a block diagram of a display unit.

The display unit 6b receives the activity sum E and the count N from the third arithmetic circuit 4b and displays data. Referring to FIG. 15, the display unit 6b comprises a classifying circuit 48 for classifying counts N, a color tone indicator 49 for displaying a class value according to a value provided by the classifying circuit 48, a tone generator 50 for generating a tone and a numeric display 51. The display unit 6b displays necessary data.

Embodiment 1-4

Figure 16:
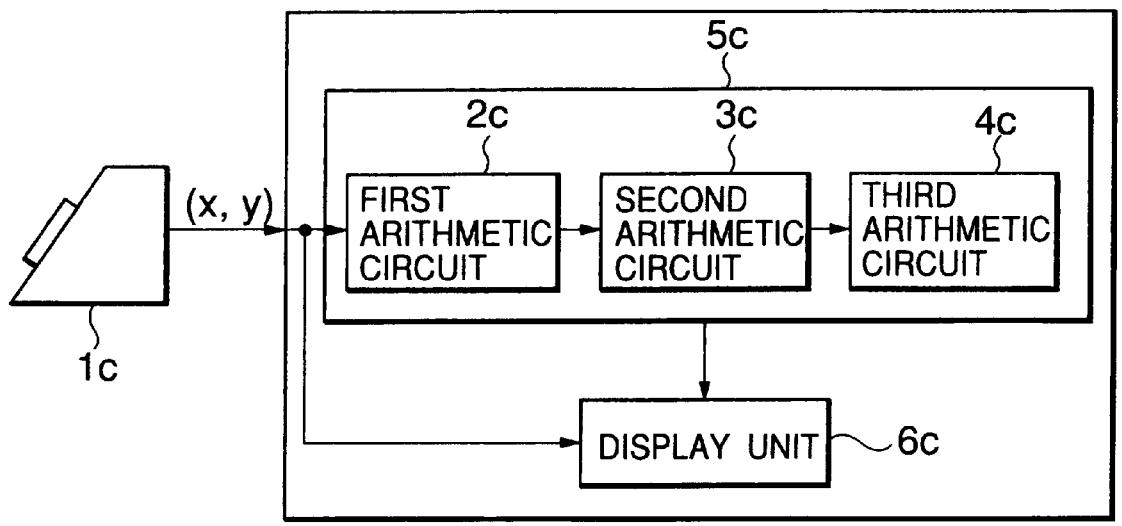
FIG. 16 is a block diagram of a moving pattern determining apparatus in an embodiment 1-4 according to the present invention.

Referring to FIG. 16 showing a moving pattern determining apparatus in an embodiment 1-4 according to the present invention, the moving pattern determining apparatus employs, as an object tracking device 1c, light receiving device provided with a plurality of light receiving elements, such as photodiodes, and mounted on a two-axis actuator for the automatic tracking of an object. The object tracking device 1c provides a position signal indicating a position of the object. This moving pattern determining apparatus is able to find the moving pattern of an object which performs a movement different from an expected movement.

The object tracking device 1c is connected to a moving pattern determining unit 5c comprising a first arithmetic circuit 2c, a second arithmetic circuit 3c and a third arithmetic circuit 4c, which are connected sequentially. A display unit 6c is connected to the moving pattern determining unit 5c.

Figure 17:
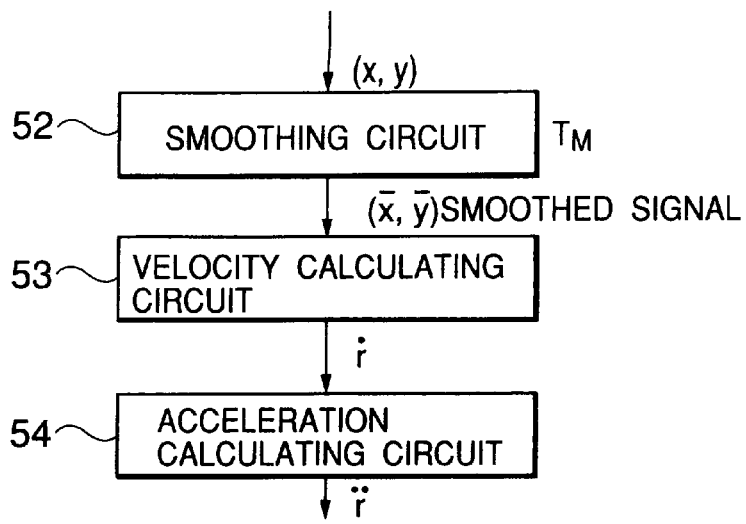
FIG. 17 is a flow chart of assistance in explaining the operation of a first arithmetic circuit.

Referring to FIG. 16, the object tracking device 1c gives a position signal (x, y) indicating a position of the object to the first arithmetic circuit 2c and the display unit 6c. The first arithmetic circuit 2c executes an arithmetic operation shown in FIG. 17. A smoothing circuit 52 smoothes the position signal (x, y) and provides a smoothed position signal ($\bar{x}, \bar{y}$).

$$\bar{x} = \text{SMT}[x] \tag{1-25}$$

$$\bar{y} = \text{SMT}[y] \tag{1-26}$$

where SMT[ ] signifies the smoothing operation of the smoothing circuit 52. The smoothed position signal (x, y) is processed by a velocity calculating circuit 53 to provide a velocity r'.

$$x'=\text{DIF}[\bar{x}] \quad (1\text{-}27)$$

$$y'=\text{DIF}[\bar{y}] \quad (1\text{-}28)$$

$$r'=\sqrt{\bar{x}'+\bar{y}'} \quad (1\text{-}29)$$

An acceleration calculating circuit 54 operates the velocity r' to provide an acceleration r".

$$r''=\text{DIF}[r'] \quad (1\text{-}30)$$

Figure 18:
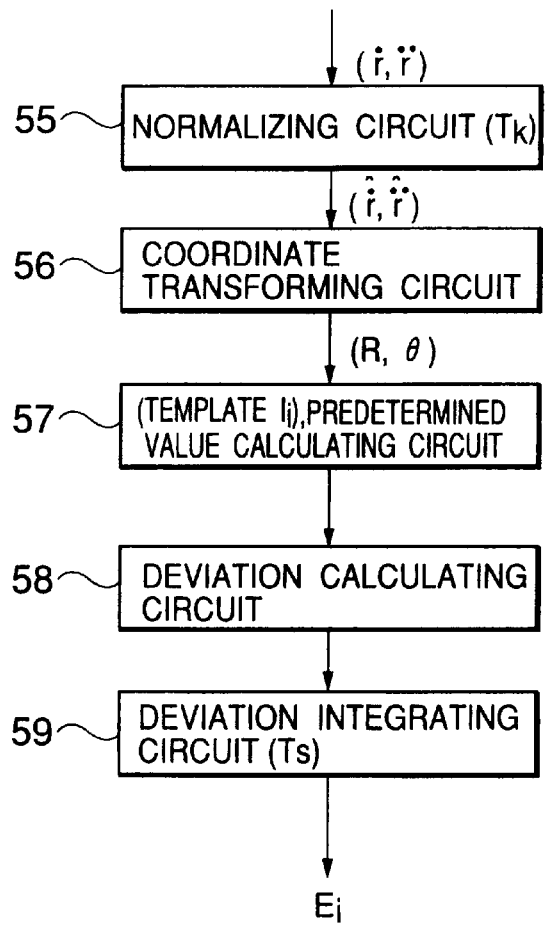
FIG. 18 is a flowchart of assistance in explaining the operation of a second arithmetic circuit.

The second arithmetic circuit 3c receives the velocity r' and the acceleration r" from the first arithmetic circuit 2c and executes an arithmetic operation shown in FIG. 18 to determine a characteristic value Ei. A normalizing circuit 55 normalizes the velocity r' and the acceleration r".

$$\hat{r}'=(r'-\bar{r}'_k)/\sigma_{r'} \quad (1\text{-}31)$$

$$\hat{r}''=(r''-\bar{r}''_k)/\sigma_{r''} \quad (1\text{-}32)$$

where $\bar{r}'$ and $\bar{r}''$, and $\sigma_{r'}$ and $\sigma_{r''}$ are the mean of velocities r', the mean of accelerations r", the standard deviation of velocities r' and the standard deviation of accelerations in a long time $T_k$, respectively, which are measured beforehand.

The set of normalized velocity $\hat{r}'$ and the normalized acceleration $\hat{r}''$, i.e., D($\hat{r}'$, $\hat{r}''$) of the two-dimensional Cartesian coordinate system is converted into the set of a distance R and an angle θ, i.e., Ⓗ (R, θ) by a coordinate transforming circuit 56 by using Expressions (1-33) and (1-34).

$$R=(\hat{r}''^2+\hat{r}'^2)^{1/2} \quad (1\text{-}33)$$

$$\theta=\tan^{-1}(\hat{r}''/\hat{r}') \quad (1\text{-}34)$$

Figure 19:
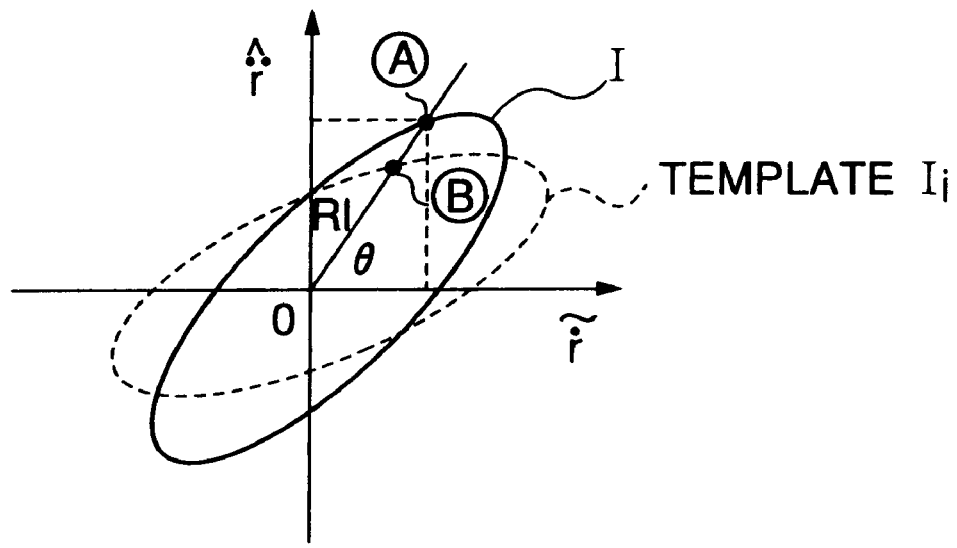
FIG. 19 is a diagrammatic view of assistance in explaining the operation of a second arithmetic circuit.

A predetermined distance $R_i$ can be determined by using a template $I_i$ of a predetermined velocity r' and a predetermined acceleration r" which are determined beforehand by a predetermined value calculating circuit 57. As shown in FIG. 19, a distance $R_i$, i.e., a distance OB in FIG. 19, corresponding to an angle θ on the template $I_i$ can be determined on the basis of the relation between the locus I($\hat{r}'$, $\hat{r}''$) of the coordinates D($\hat{r}'$, $\hat{r}''$) and the template $I_i(\hat{r}'$, $\hat{r}''$).

$$R_i=I_i(\theta) \quad (1\text{-}35)$$

The distance $R_i$ on the thus obtained template $I_i$ and the distance R previously determined by the coordinate transforming circuit 56 are given to a deviation calculating circuit 58, and a square deviation $F_i$ on the template $I_i$ is calculated by using Expression (1-36).

$$F_i=(R-R_i)^2 \quad (1\text{-}36)$$

The sum of the squares deviation $F_i$ is calculated every predetermined period $T_s$ by a deviation integrating circuit 59 by using Expression (1-37) to determine a characteristic value $E_i$.

$$E_i=\text{INT}[F_i]^{Ts} \quad (1\text{-}37)$$

where INT[ ]$^{Ts}$ signifies the integrating operation in a time $T_s$ of the deviation integrating circuit 59.

Figure 20:
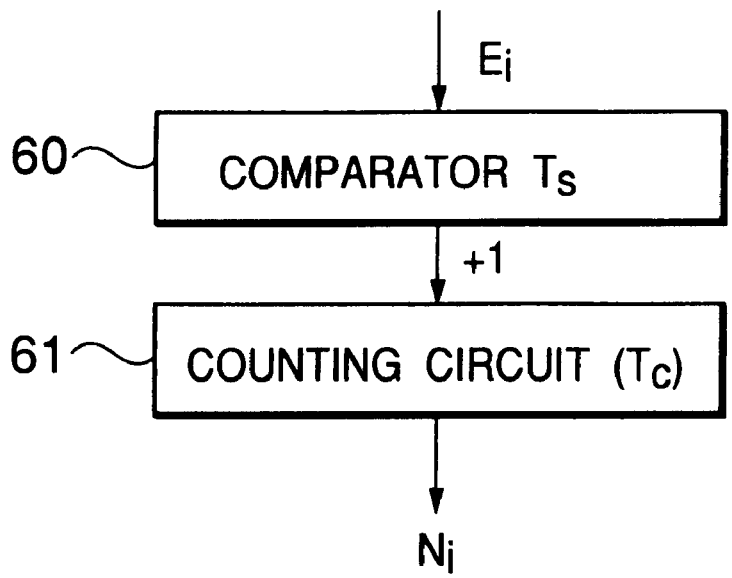
FIG. 20 is a floe chart of assistance in explaining the operation of a third arithmetic circuit.

In the third arithmetic circuit 4c, a comparator 60 (FIG. 20) compares the characteristic value $E_i$, i.e., the sum of squares deviation calculated by the second arithmetic circuit 3c, with a predetermined value $E_0$ every predetermined period $T_s$ and generates pulse of +1 if $E_i > E_0$. A counting circuit 61 counts the pulses of +1 in a moving counting time $T_c$ and provides a count $N_i$.

Figure 21:
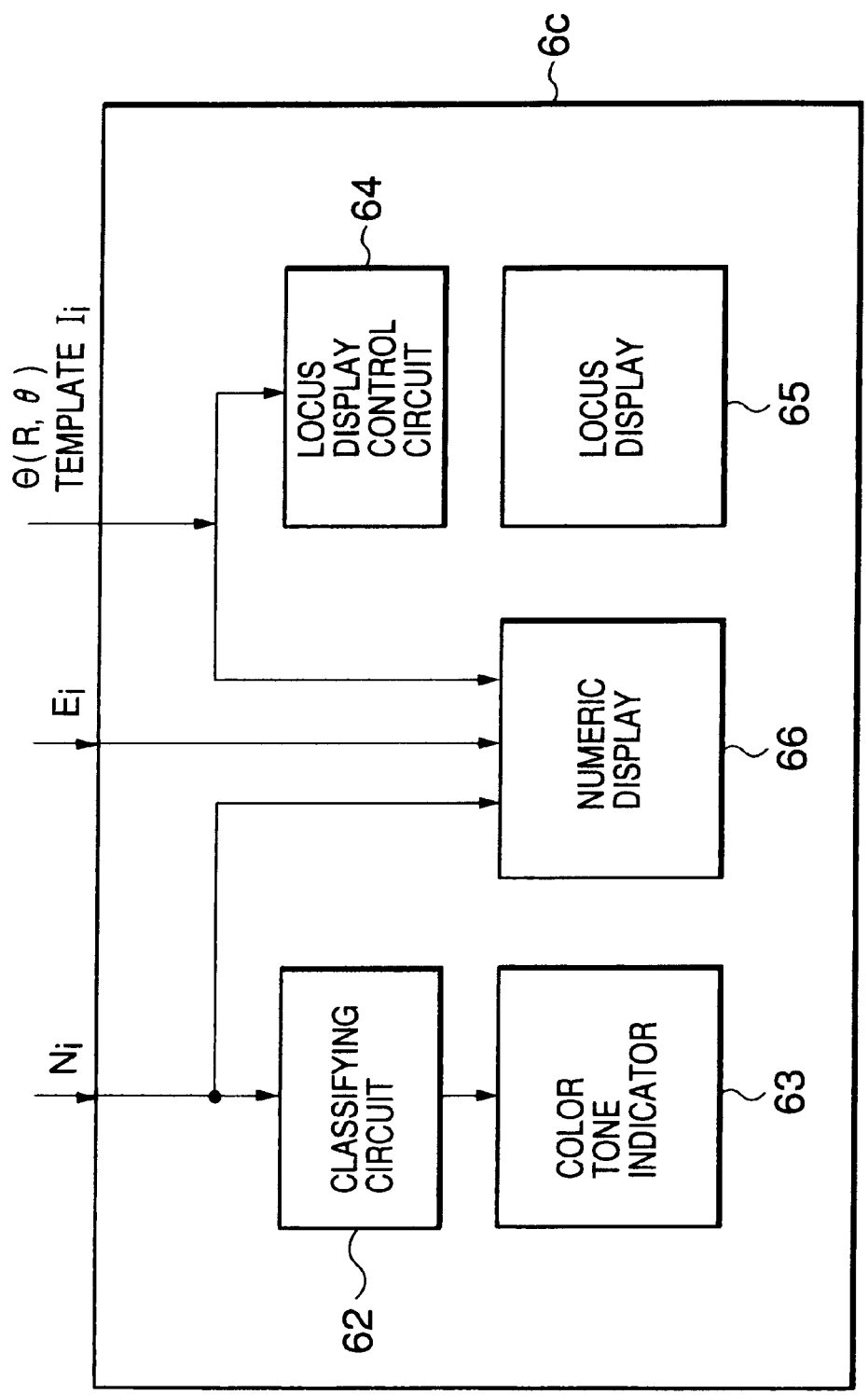
FIG. 21 is a block diagram of a display unit.

The display unit 6c shown in FIG. 21 receives the polar coordinates Ⓗ (R, θ), the template $I_i$ and the characteristic value $E_i$ provided by the second arithmetic circuit 3c, and the count $N_i$ provided by the third arithmetic circuit 4c, and displays data. The display unit 6c comprises a classifying circuit 62 for classifying counts $N_i$, a color tone indicator 63 for displaying a class for the template $I_i$ according to a value provided by the classifying circuit 62, a locus display control circuit 64 for displaying the locus of the polar coordinates Ⓗ (R, θ) on the polar coordinate system in the template $I_i$, a locus display 65 for displaying the output of the locus display control circuit 64 for each template $I_i$, and a numeric display 66 for displaying the count $N_i$, the characteristic value $E_i$, polar coordinates Ⓗ (R, θ) and template polar coordinates Ⓗ ($R_i$, $\theta_i$). The displays 65 and 66 display data.

Embodiment 1-5

Figure 22:
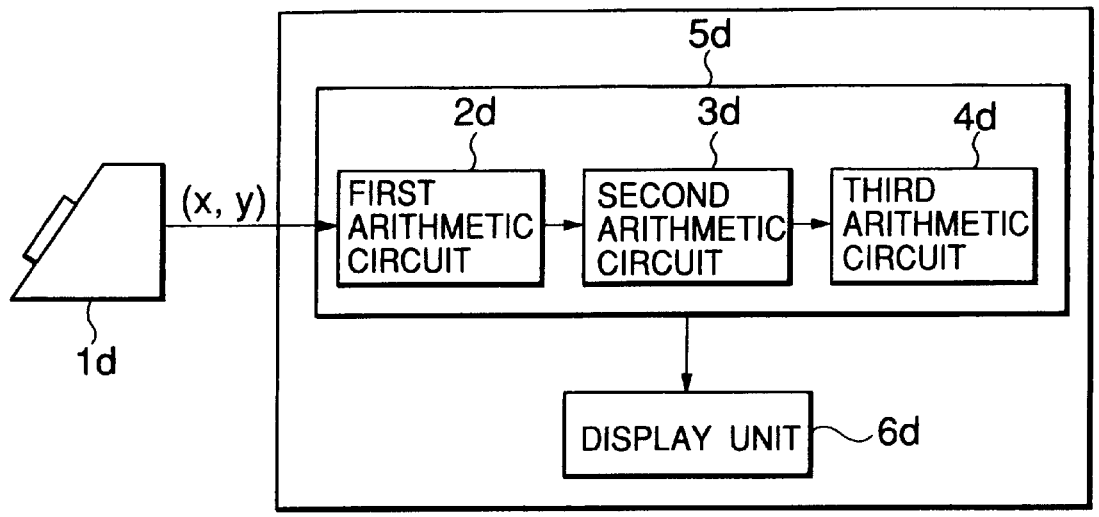
FIG. 22 is a block diagram of a moving pattern determining apparatus in an embodiment 1-5 according to the present invention.

Referring to FIG. 22 showing a moving pattern determining apparatus in an embodiment 1-5 according to the present invention for determining the moving pattern of an object, the moving pattern determining apparatus employs, as an object tracking device 1d, a light receiving device provided with a plurality of light receiving elements, such as photodiodes, and mounted on a two-axis actuator for the automatic tracking of the object. The object tracking device 1d provides a position signal indicating a position of the object. This moving pattern determining apparatus is able to find the moving pattern of an object even if the movement of the object is changed by an external force or the like.

The object tracking device 1d is connected to a moving pattern determining unit 5d comprising a first arithmetic circuit 2d, a second arithmetic circuit 3d and a third arithmetic circuit 4d, which are connected sequentially. A display unit 6d is connected to the moving pattern determining unit 5d. As shown in FIG. 22, a position signal (x, y) indicating a position of the object and provided by the object tracking device 1d is given to the first arithmetic circuit 2d. The first arithmetic circuit 2d executes operations shown in FIG. 23.

Figure 23:
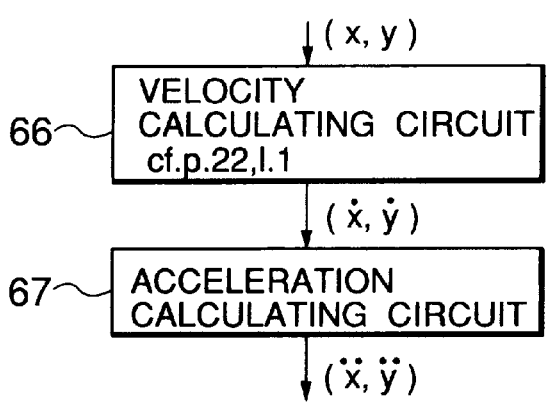
FIG. 23 is a flow chart of assistance in explaining the operation of a first arithmetic circuit.
Figure 24:
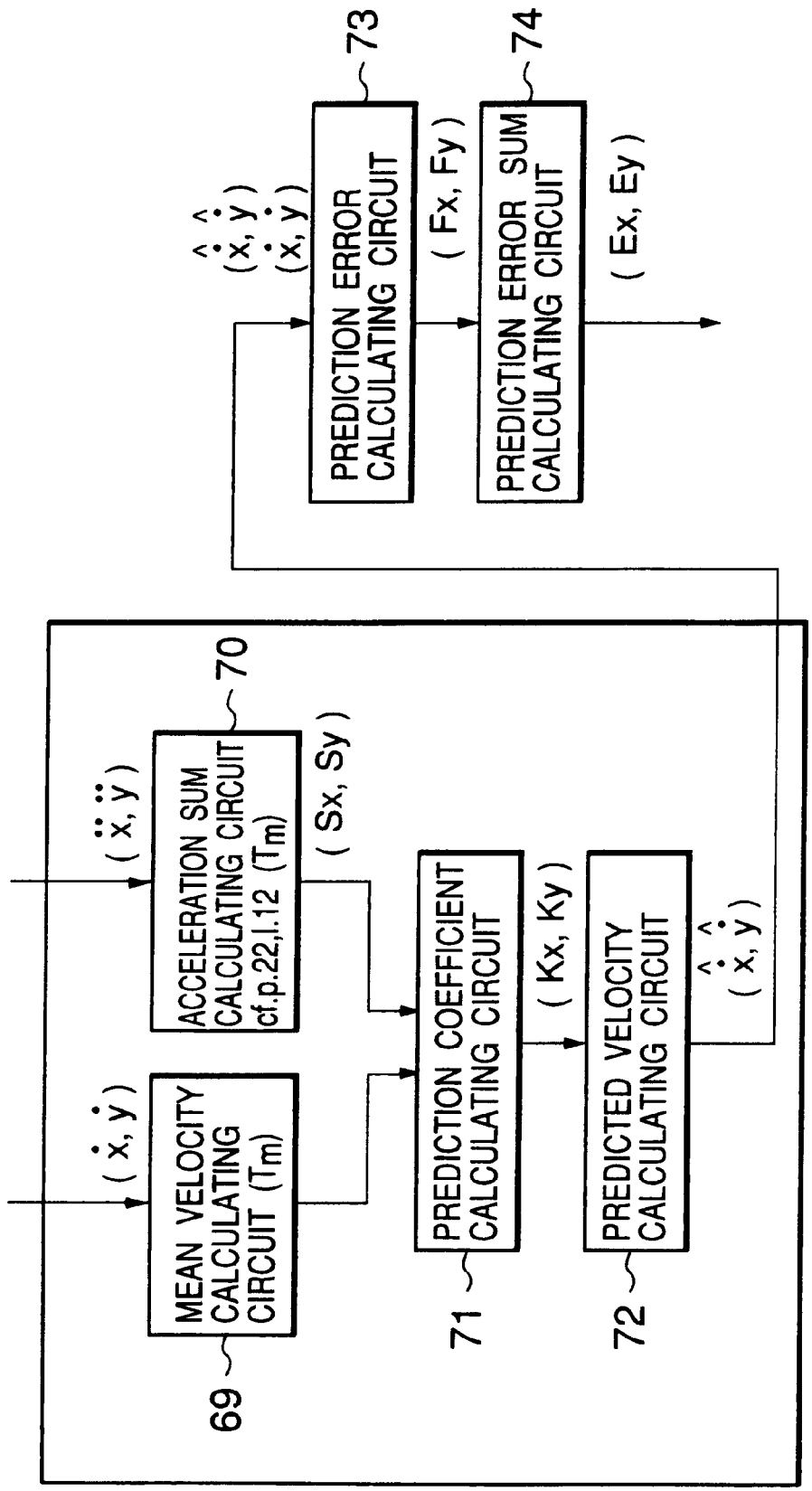
FIG. 24 is a flow chart of assistance in explaining the operation of a second arithmetic circuit.

Referring to FIG. 23, the position signal (x, y) is processed by a velocity calculating circuit 66 by using Expressions (1-38) and (1-39) to determine velocities x' and y'.

$$x'=\text{DIV}[x] \quad (1\text{-}38)$$

$$y'=\text{DIV}[y] \quad (1\text{-}39)$$

An acceleration calculating circuit 67 processes the velocities x' and y' by using Expressions (1-40) and (1-41) to obtain accelerations x" and y".

$$x''=\text{DIV}[x'] \quad (1\text{-}40)$$

$$y''=\text{DIV}[y'] \quad (1\text{-}41)$$

In the second arithmetic circuit 3d, a velocity predicting circuit 68 processes the velocities x' and y' and the accelerations x" and y" calculated by the first arithmetic circuit 2d to obtain predicted velocities $\hat{x}'$ and $\hat{y}'$. In the velocity predicting circuit 68, a mean velocity calculating circuit 69 calculates the mean velocities $\bar{x}'$ and $\bar{y}'$ of the velocities x' and y' every predetermined moving time $T_M$, and an acceleration sum calculating circuit 70 calculates acceleration integrals $S_x$ and $S_y$ every predetermined moving time $T_M$ by using Expressions (1-42), (1-43), (1-44) and (1-45).

$$\bar{x}'=\text{MEN}[x']^{TM} \quad (1\text{-}42)$$

$$\bar{y}'=\text{MEN}[y']^{TM} \quad (1\text{-}43)$$

$$S_x=\text{INT}[x']^{TM} \quad (1\text{-}44)$$

$$S_y=\text{INT}[y']^{TM} \quad (1\text{-}45)$$

In the velocity predicting circuit 68, a prediction coefficient calculating circuit 71 calculates prediction coefficients $K_x$ and $K_y$ for predictive expressions to be used for predicting tendencies of variation of the velocities by using Expressions (1-46) and (1-47).

$$K_x=\bar{x}'/S_x \quad (1\text{-}46)$$

$$K_y=\bar{y}'/S_y \quad (1\text{-}47)$$

Then, in the velocity predicting circuit 68, a predicted velocity calculating circuit 72 calculates predicted velocities by using Expressions (1-48) and (1-49).

$$\hat{x}'=K_x\cdot(x'/S_x) \quad (1\text{-}48)$$

$$\hat{y}'=K_y\cdot(y'/S_y) \quad (1\text{-}49)$$

The predicted velocities $\hat{x}'$ and $\hat{y}'$, and the velocities $x'$ and $y'$ calculated by the velocity calculating circuit 66 are given to a prediction error calculating circuit 73. Then, the prediction error calculating circuit 73 calculates prediction errors $F_x$ and $F_y$ by using Expressions (1-50) and (1-51).

$$F_x=\hat{x}'-x' \quad (1\text{-}50)$$

$$F_y=\hat{y}'-y' \quad (1\text{-}51)$$

A prediction error sum calculating circuit 74 integrates the prediction errors $F_x$ and $F_y$ for a moving integration time $T_s$ by using Expressions (1-52) and (1-53) to obtain error Sums $E_x$ and $E_y$, and then the second arithmetic circuit 3d provides the error sums $E_x$ and $E_y$.

$$E_x=\text{INT}[F_x] \quad (1\text{-}52)$$

$$E_y=\text{INT}[F_y] \quad (1\text{-}53)$$

Figure 25:
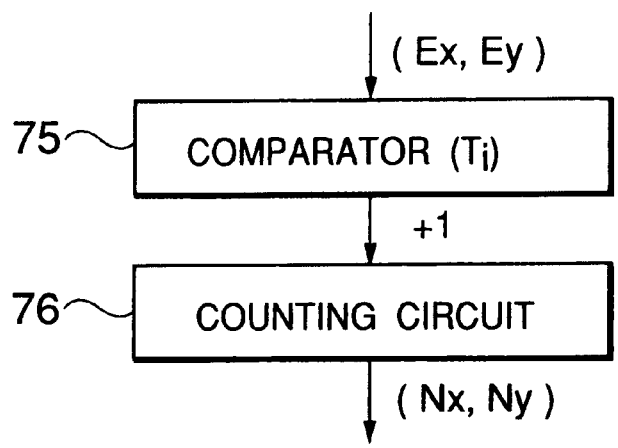
FIG. 25 is a flow chart of assistance in explaining the operation of a third arithmetic circuit.

Referring to FIG. 25, in the third arithmetic circuit 4d, a comparator 75 compares the error sums $E_x$ and $E_y$ respectively with predetermined values $E_{0x}$ and $E_{0y}$ every predetermined period $T_i$ and generates pulse of +1 if $E_x>E_{0x}$ and $E_y>E_{0y}$. A counting circuit 76 counts the pulses of +1 in a moving counting time $T_c$ and provides counts $N_x$ and $N_y$.

Figure 26:
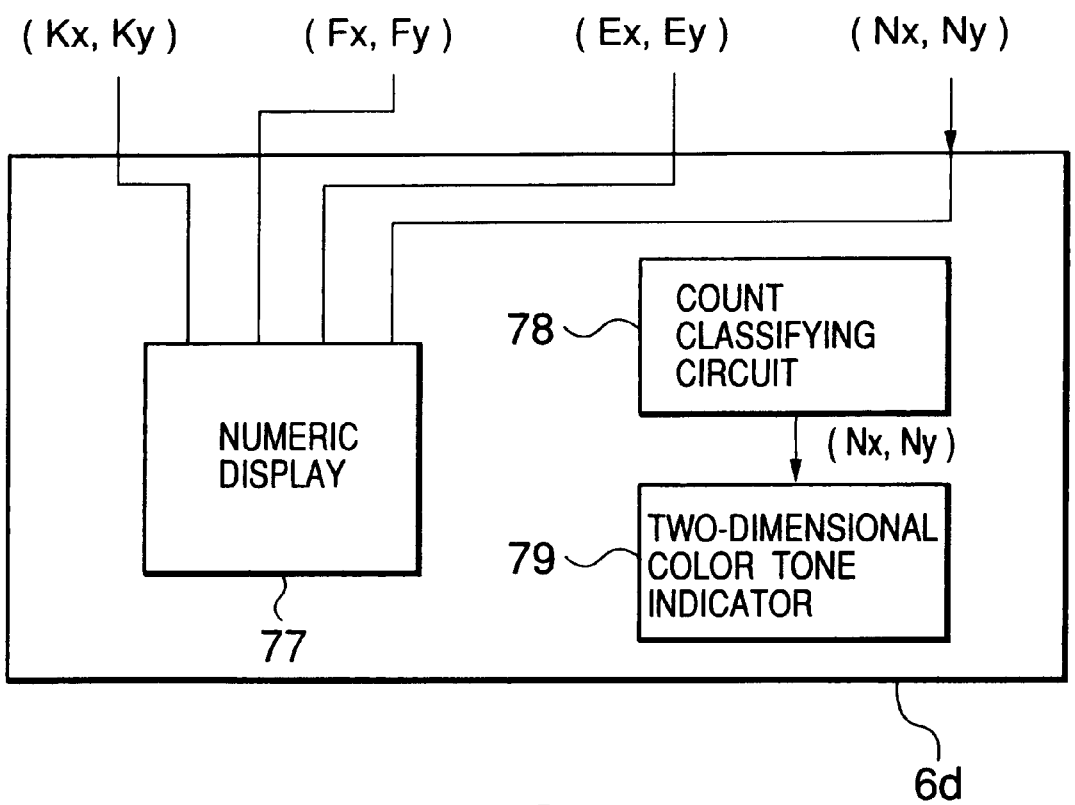
FIG. 26 is a block diagram of a display unit.

The display unit 6d shown in FIG. 26 receives the prediction coefficients $K_x$ and $K_y$, prediction errors $F_x$ and $F_y$, and the error sums $E_x$ and $E_y$ provided by the second arithmetic circuit 3d, and displays data by a numeric display 77. The display unit 6d comprises a classifying circuit 78 for classifying counts $N_x$ and $N_y$ provided by the third arithmetic circuit 4d, and a two-dimensional color tone indicator 79 connected to the classifying circuit 78 and capable of indicating the intensities of the counts $N_x$ and $N_y$ in two-dimensional color tones.

The prediction error calculating circuit 73 is able to construct a learning model or a linear prediction model for calculating learning errors in the discrete values of the velocities $x'$ and $y'$.

As is apparent from the foregoing description, according to the present invention, the first arithmetic circuit can determine the positional time-variation of the object on the basis of position signals indicating positions of the object provided by the object tracking device, and the second arithmetic circuit can accurately determine the characteristic value representing the movement of the object. The third arithmetic circuit can accurately find the moving pattern of the object in a short time through the determination of the moving mode of the object.

Second Embodiment

Embodiment 2-1

(FIGS. 27 to 33)

Figure 27:
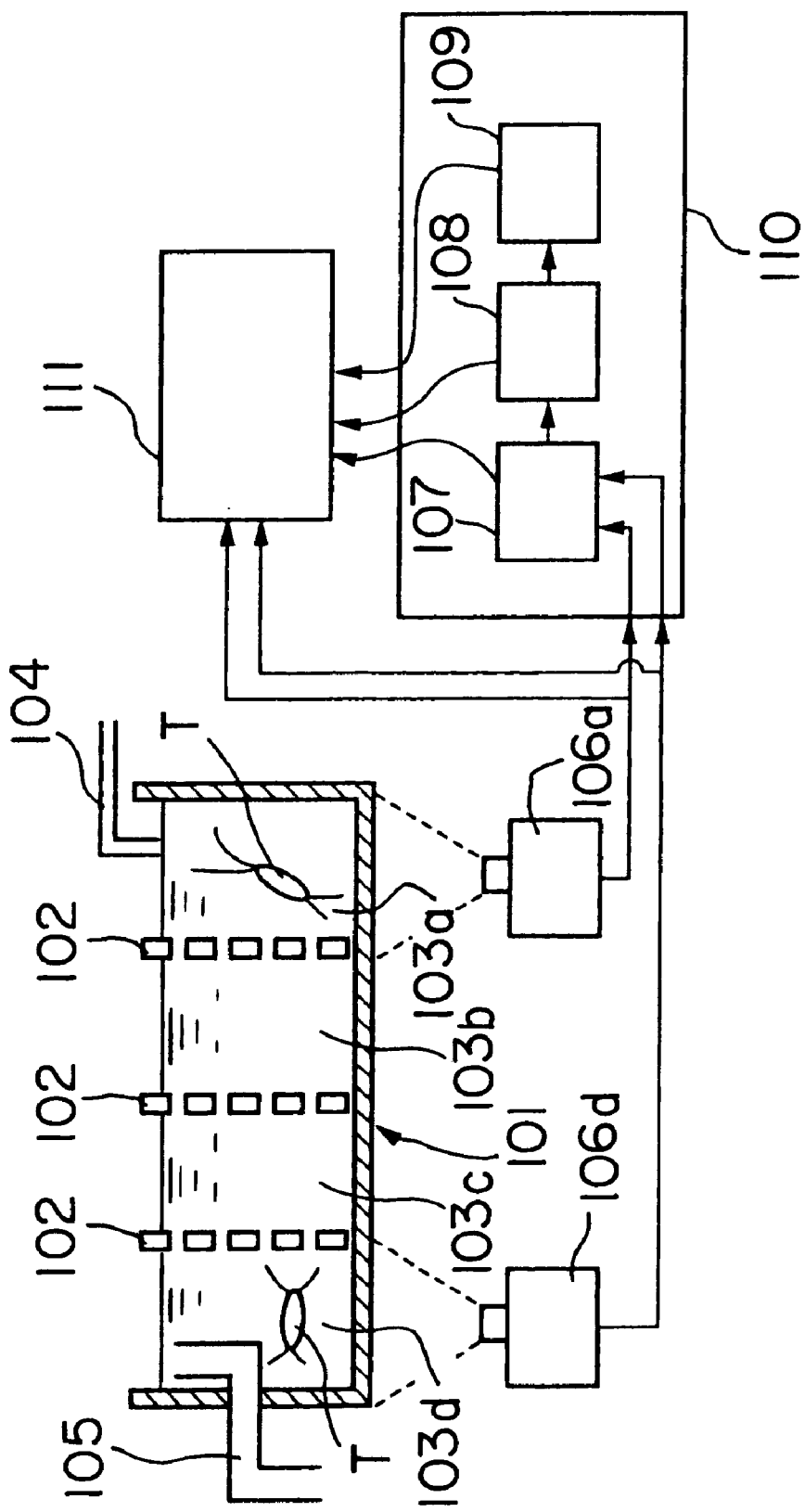
FIG. 27 is a block diagram of a moving pattern determining apparatus in an embodiment 2-1 according to the present invention.

Referring to FIG. 27 a moving pattern determining apparatus for determining the moving pattern of an object is provided with a plurality of linearly arranged water tanks 103a, 103b, 103c and 103d formed by dividing the interior of an elongate tank 101 by partition walls 102 provided with openings and similar to a current plate. Water, i.e., an object of inspection, is supplied through a water supply pipe 4 into the uppermost water tank 103a, flows sequentially through the intermediate water tanks 103b and 103c into the lowermost water tank 103d and is discharged through a discharge pipe 105. Aquatic organisms (objects) T are kept in the uppermost water tank 103a and the lowermost water tank 103d.

Object tracking devices 106a and 106d, such as video cameras, are disposed opposite to the side surfaces of the water tanks 103a and 103d, respectively, to track the aquatic organisms T and to find the positions of the aquatic organisms T. The object tracking devices 106a and 106d are connected to a first arithmetic circuit (positional time-variation calculating means) 107. The first arithmetic circuit 107 is connected to a second arithmetic circuit (characteristic value calculating means) 108 for determining the moving characteristic values representing the movement of the aquatic organisms T, and the second arithmetic circuit 108 is connected to a third arithmetic circuit (moving pattern calculating means) 109 for calculating the moving patterns of the aquatic organisms T. The first arithmetic circuit 107, the second arithmetic circuit 108 and the third arithmetic circuit 109 constitute a moving pattern determining unit 110. A display unit 111 is connected to the moving pattern determining unit 110.

In operation, the object tracking device 106a finds a position of the aquatic organism T in the water tank 103a, the object tracking device 106d finds a position of the aquatic organism T in the water tank 103d. The object tracking devices 106a and 106d give position signals $(X_1, Y_1)$ and $(X_2, Y_2)$ to the first arithmetic circuit 107 and the display unit 111.

Figure 28:
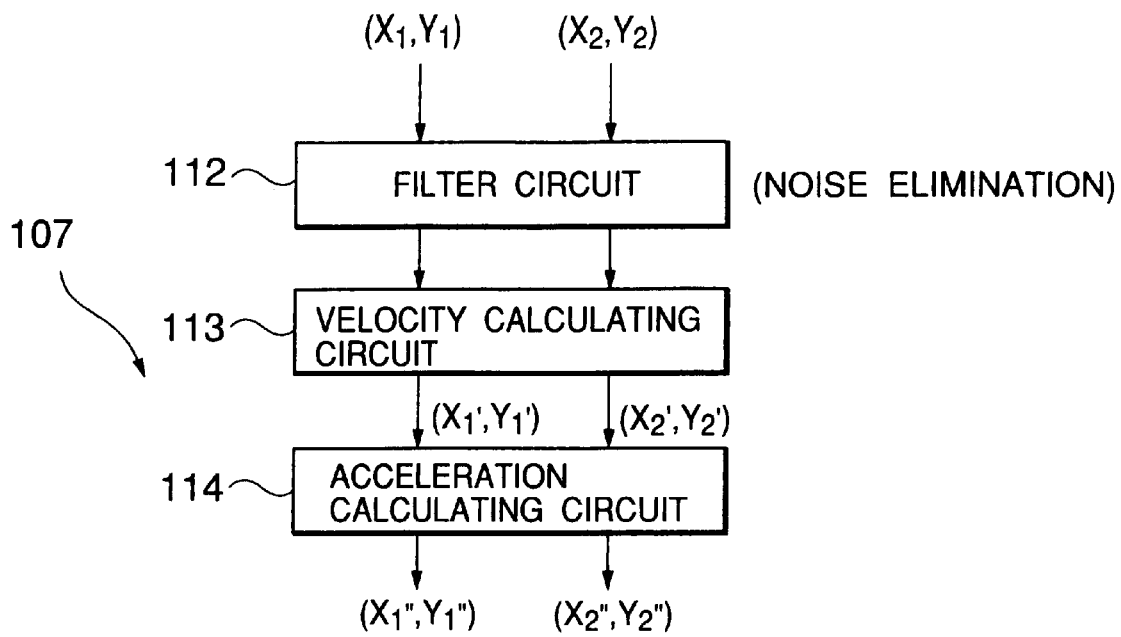
FIG. 28 is a flow chart of assistance in explaining the operation of a first arithmetic circuit.

The first arithmetic circuit 107 executes an operation shown in FIG. 28. A low-pass filter included in a filter circuit 112 eliminates noises from the position signals $(X_1, Y_1)$ and $(X_2, Y_2)$ indicating the positions of the aquatic organisms T in the water tanks 103a and 103d. A velocity calculating circuit 113 processes the position signals $(X_1, Y_1)$ and $(X_2, Y_2)$ to obtain velocities $(X_1', Y_1')$ and $(X_2', Y_2')$ by using Expressions (2-1), (2-2), (2-3 and (2-4).

$$X_1'=\text{DIF}[X_1(t)] \quad (2\text{-}1)$$

$$Y_1'=\text{DIF}[Y_1(t)] \quad (2\text{-}2)$$

$$X_2'=\text{DIF}[X_2(t)] \quad (2\text{-}3)$$

$$Y_2'=\text{DIF}[Y_2(t)] \quad (2\text{-}4)$$

where DIF[ ] signifies the differentiating operations of differentiators.

An acceleration calculating circuit 14 included in the first arithmetic circuit 107 calculates accelerations by using Expressions (2-5), (2-6), (2-7) and (2-8).

$$X_1''=\text{DIF}[X_1'(t)] \quad (2\text{-}5)$$

$$Y_1''=\text{DIF}[Y_1'(t)] \quad (2\text{-}6)$$

$$X_2''=\text{DIF}[X_2'(t)] \quad (2\text{-}7)$$

$$Y_2''=\text{DIF}[Y_2'(t)] \quad (2\text{-}8)$$

Figure 29:
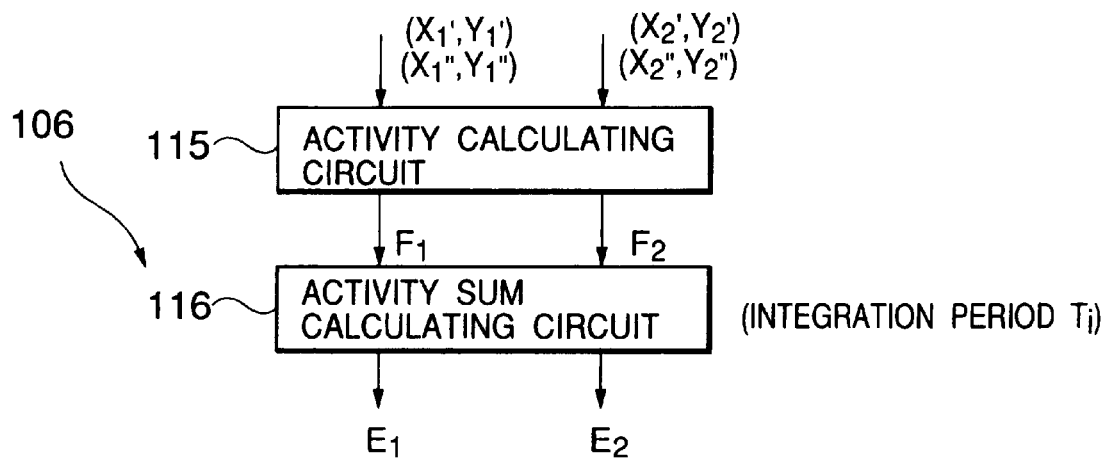
FIG. 29 is a flow chart of assistance in explaining the operation of a second arithmetic circuit.
Figure 30:
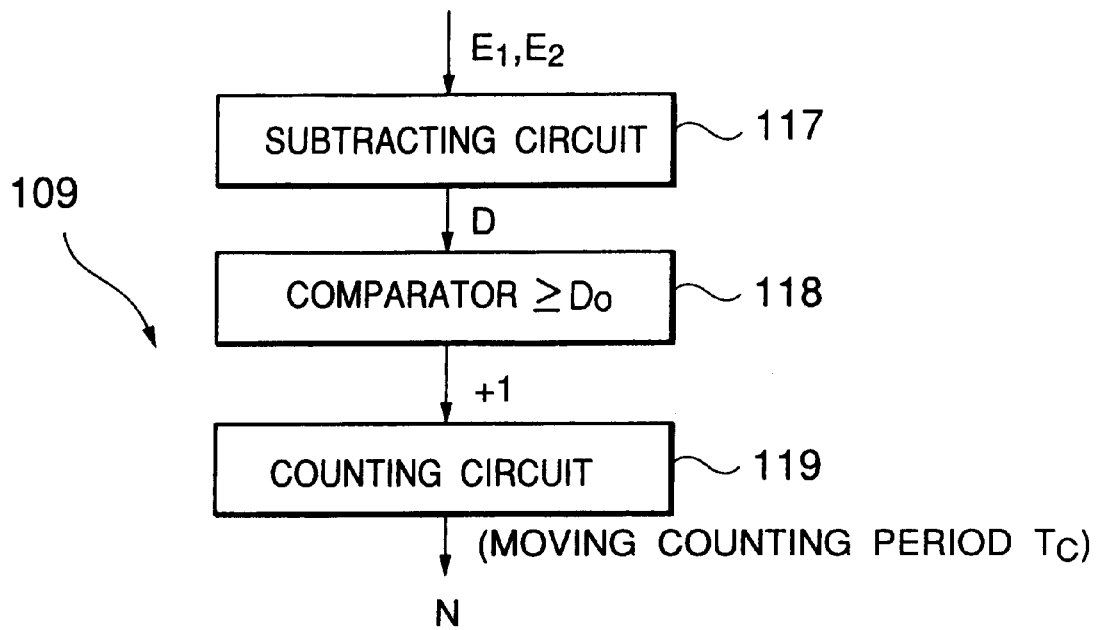
FIG. 30 is a flow chart of assistance in explaining the operation of a third arithmetic circuit.

The second arithmetic circuit 108 receives signals representing the velocities ($X_1'$, $Y_1'$) and ($X_2'$, $Y_2'$), and the accelerations ($X_1''$, $Y_1''$) and ($X_2''$, $Y_2''$) from the first arithmetic circuit 107, and executes an operation shown in FIG. 29 to obtain characteristic values $E_1$ and $E_2$. As shown in FIG. 29, an activity calculating circuit 15 and an activity sum calculating circuit 16 calculates the characteristic value $E_1$ of the water tank 103a and the characteristic value $E_2$ of the water tank 103d by processing the velocities ($X_1'$, $Y_1'$) and the accelerations ($X_1''$, $Y_1''$) of the aquatic organism T in the water tank 103a, and the velocities ($X_1''$, $Y_1''$) and the accelerations ($X_2''$, $Y_2''$) of the aquatic organism in the water tank 103d by using Expressions (2-9), (2-10), (2-11) and (2-12).

$$F_1=aX_1''+bX_1'^2+cY_1''+dY_1'^2 \quad (2\text{-}9)$$

$$F_2=aX_2''+bX_2'^2+cY_2''+dY_2'^2 \quad (2\text{-}10)$$

$$E_1=T_1/2F_1 \quad (2\text{-}11)$$

$$E_2=T_1/2F_2 \quad (2\text{-}12)$$

where a, b, c and d are weighting constants meeting conditions determined on the basis of the relation between conditions of an environment in which the aquatic organisms T move and the movement of the aquatic organisms T. The weighting constants a, b, c and d are values which can be empirically determined for equalizing the contributions of the activities F expressed by Expressions (2-9) and (2-10) to the variation of the velocities and the accelerations.

The characteristic values $E_1$ and $E_2$ expressed by Expressions (2-11) and (2-12) are obtained by integrating the activity $F_1$ of the water tank 103a and the activity $F_2$ of the water tank 103d with respect t time, i.e., the activity sums of the activities $F_1$ and $F_2$ in an integration period $T_i$.

In the third arithmetic circuit 109, a subtracting circuit 117 calculates the activity difference $D=E_1-E_2$. Then, a comparator 118 compares the activity difference D with a predetermined value $D_0$ every integration period $T_i$, and provides a pulse of +1 if $D>D_0$. A counting circuit 119 counts the count N of the pulses in a moving counting time $T_c$.

Figure 31:
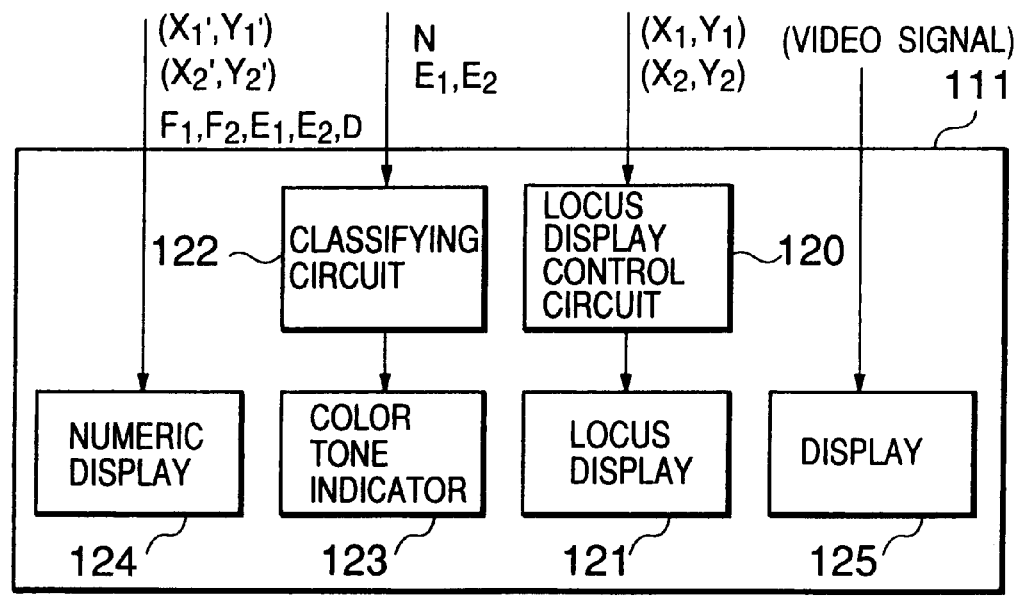
FIG. 31 is a block diagram of a display unit.

Referring to FIG. 31, the display unit 111 receives the position signals ($X_1$, $Y_1$) and ($X_2$, $Y_2$) provided by the object tracking devices 106a and 106b, the signals representing the time-varying velocities ($X_1'$, $Y_1'$) and ($X_2'$, $Y_2'$) and the accelerations ($X_1''$, $Y_1''$) and ($X_2''$, $Y_2''$) and provided by the first arithmetic circuit 107, the activities $F_1$ and $F_2$ and the activity sums $E_1$ and $E_2$ provided by the second arithmetic circuit 108, and the activity difference D and the count N provided by the third arithmetic circuit 109, and displays data. The display unit 111 comprises a locus display control circuit 120 for determining the loci of the aquatic organisms T in the water tanks 103a and 103d in a predetermined display time on the basis of the position signals ($X_1$, $Y_1$) and ($X_2$, $Y_2$), a locus display 121 for displaying the output loci of the locus display control circuit 120, a classifying circuit 122 for classifying the activity sums $E_1$ and $E_2$ provided by the second arithmetic circuit 108 and the count N provided by the third arithmetic circuit 109, a color tone indicator 123 for indicating class values provided by the classifying circuit 122, a numeric display 124 for displaying the velocities ($X_1'$, $Y_1'$) and ($X_2'$, $Y_2'$), the accelerations ($X_1''$, $Y_1''$) and ($X_2''$, $Y_2''$) the activities $F_1$ and $F_2$ and the activity sums $E_1$ and $E_2$ provided by the moving pattern determining unit 10, and a display 125 for displaying images represented by video signals provided by the object tracking devices 106a and 106d or other video camera. The results of moving pattern determining operations are displayed by the display unit 111.

Thus, the moving pattern determining apparatus in this embodiment is capable of accurately determining the moving patterns of the aquatic organisms in the plurality of water tanks in a short time.

Figure 32:
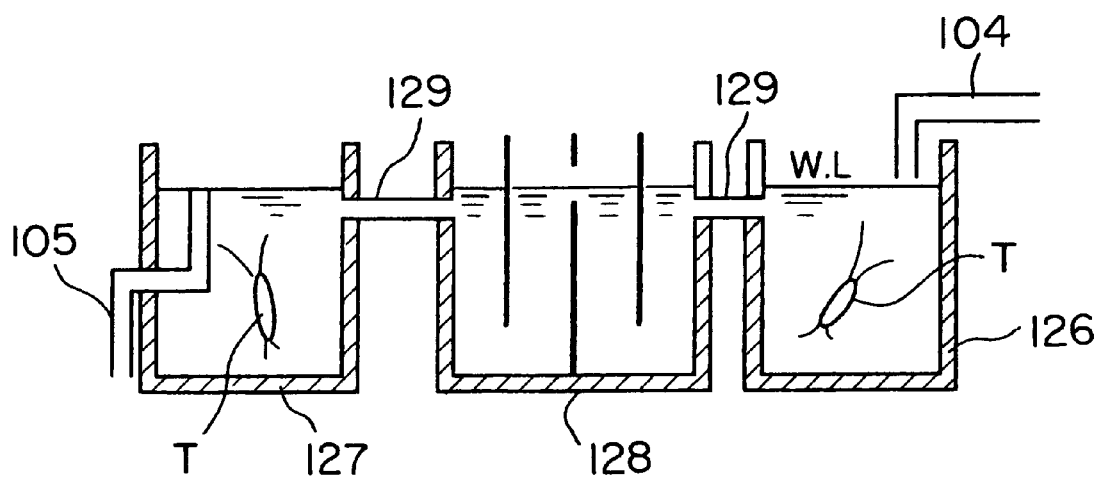
FIG. 32 is a typical view of water tanks.
Figure 33:
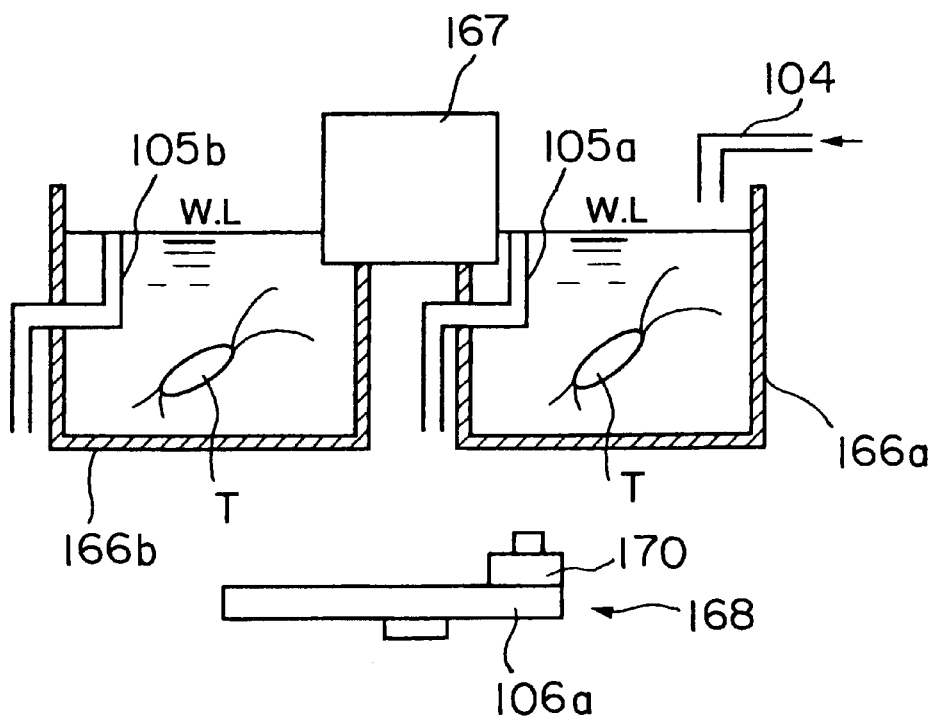
FIG. 33 is a typical view of a modification of the water tanks of FIG. 32.

Water tanks shown in FIGS. 32 or 33 may be used instead of the plurality of water tanks 103a, 103b, 103c and 103d separated by the partition walls 102. As shown in FIG. 32, a head flow passage 128 may be interposed between a first water tank 126 and a second water tank 127, and the water tanks 126 and 127 may be connected to the head flow passage 128 by small diameter pipes 129. Water to be inspected is supplied through a water supply pipe 104 into the first water tank 126, flows through the head flow passage 128 into the second water tank 127 and is discharged through a discharge pipe 105. Aquatic organisms T are kept in the first water tank 126 and the second water tank 127.

Referring to FIG. 33, water tanks 166a and 166b are connected by a normally open motor-driven movable weir 167. Test water is supplied through a water supply pipe 104 into the water tank 166a, flows through the movable weir 167 into the water tank 166b and is discharged through a discharge pipe 105b. While the movable weir is open, the test water is not discharged through a discharge pipe 105a. Aquatic organisms T are kept in the water tanks 166a and 166b. An object tracking device 168 is disposed near the water tanks 166a and 166b. The object tracking device 168 comprises a rotary stage 169 and an object tracking unit 170. When the moving pattern (characteristic value) $E_1$ of the aquatic organism T kept in the water tank 166a coincides with a predetermined pattern, the movable weir 167 is closed to discharge the test water contained in the water tank 166a through the discharge pipe 105a.

Embodiment 2-2

(FIGS. 34 to 40B)

Figure 34:
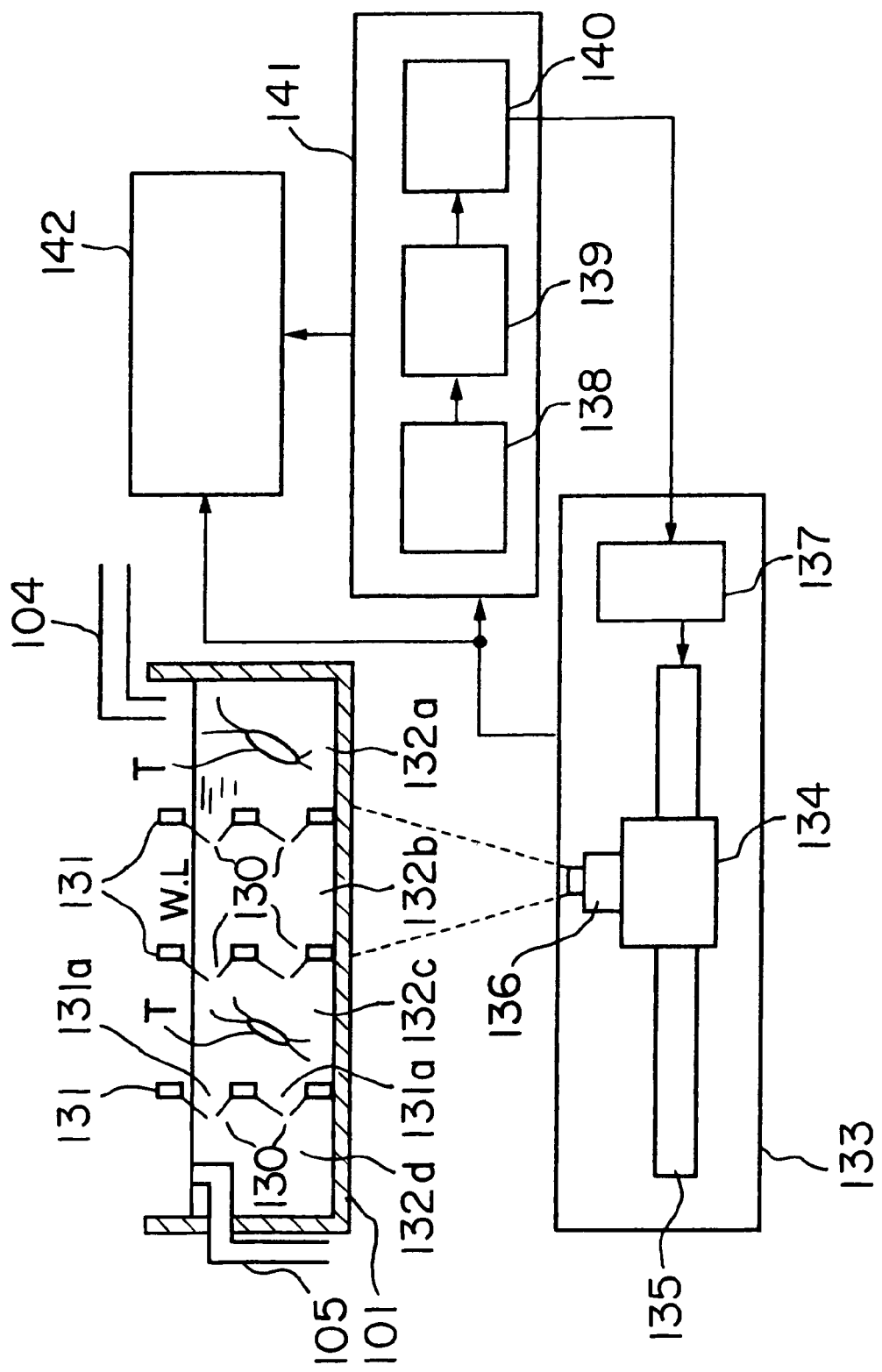
FIG. 34 is a block diagram of a moving pattern determining apparatus in an embodiment 2-2 according to the present invention.
Figure 35:
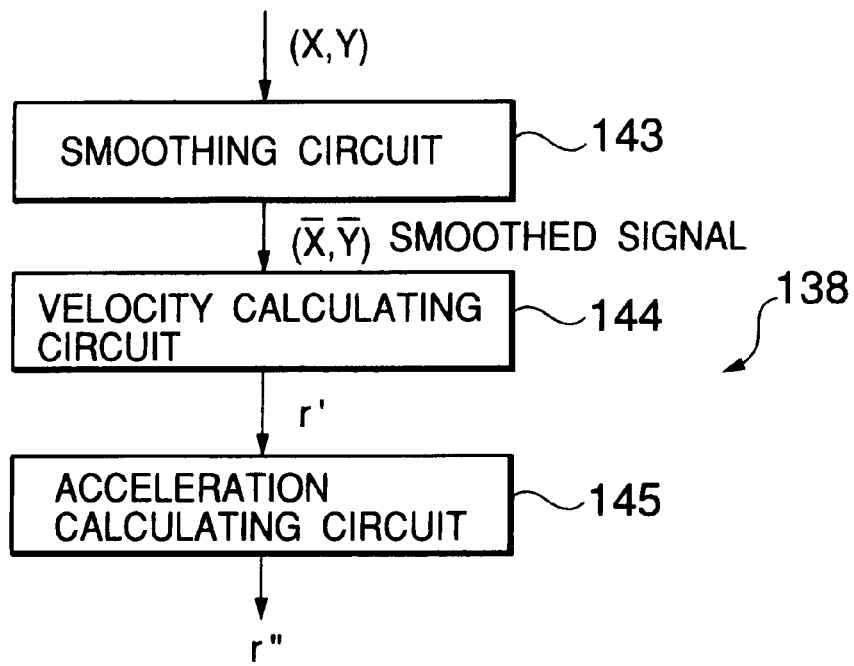
FIG. 35 is a flow chart of assistance in explaining the operation of a first arithmetic circuit.

Referring to FIG. 34, a moving pattern determining apparatus in an embodiment 2-2 according to the present invention is provided with a plurality of linearly arranged water tanks 132a, 132b, 132c and 132d formed by dividing the interior of an elongate tank 101 by partition walls 131. Return passages 131a are formed on the partition walls 131 by return members 130. Test water is supplied through a water supply pipe 104 into the uppermost water tank 132a, flows through the intermediate water tanks 132b and 132c into the lowermost water tank 132d, and is discharged through a discharge pipe 105. An aquatic organism T is kept in the uppermost water tank 132a. An object tracking device 133 is disposed beside the water tank 101. The object tracking device 133 comprises a stage guide 135 extended substantially in parallel to the flowing direction of water in the water tank 101, a stage 134 which moves along the stage guide 135, and an object tracking unit 136 fixedly mounted on the stage 134.

In the object tracking unit 136 employed in this embodiment, a light receiving device provided with a plurality of light receiving elements, such as photodiodes, is moved for automatic tracking by a two-axis actuator to provide a position signal indicating a position of the aquatic organism T. The object tracking unit 136 is attached to the stage 134. A stage positioning unit 137 for positioning the stage 134 is connected to the stage guide 135. The object tracking device 133 is connected to a first arithmetic circuit (positional time-variation calculating means) 138 for determining the positional time-variation of the aquatic organism T. The first arithmetic circuit 138 is connected to a second arithmetic circuit (characteristic value calculating means) 139, and the second arithmetic circuit 139 is connected to a third arithmetic circuit (moving pattern calculating means) 140 for calculating a moving pattern of the aquatic organism T. A tracking impossible signal $P_x$, which will be explained later, among the outputs of the third arithmetic circuit 140 is given to the positioning unit 137 of the object tracking device 133. The first arithmetic circuit 138, the second arithmetic circuit 139 and the third arithmetic circuit 140 constitute a moving pattern determining unit 141. A display unit 142 is connected to the moving pattern determining unit 141.

In operation, the object tracking device 133 gives a position signal (X, Y) indicating a position of the aquatic organism T in the water tank 132a to the first arithmetic circuit 138 and the display unit 142. The first arithmetic circuit 138 executes an operation shown in FIG. 35. the position signal (X, Y) indicating a position of the aquatic organism T in the water tank 132a is converted into a smoothed signal ($\overline{X}$, $\overline{Y}$) by a smoothing circuit 143 by using Expressions (2-13) and (2-14).

$$\overline{X} = \text{SMT}[X] \quad (2\text{-}13)$$

$$\overline{Y} = \text{SMT}[Y] \quad (2\text{-}14)$$

where SMT[ ] signifies the smoothing operation of the smoothing circuit 143. The smoothed signal ($\overline{X}$, $\overline{Y}$) are processed by a velocity calculating circuit 144 by using Expressions (2-15), (2-16) and (2-17) to obtain a velocity r'.

$$X' = \text{DIF}[\overline{X}] \quad (2\text{-}15)$$

$$Y' = \text{DIF}[\overline{Y}] \quad (2\text{-}16)$$

$$r' = (AX'^2 + BY'^2)^{1/2} \quad (2\text{-}17)$$

where A and B are constants which can be empirically determined for equalizing the respective contributions of the movement of the position of the aquatic organism T in the X-direction and the Y-direction.

An acceleration calculating circuit 145 included in the first arithmetic circuit 138 processes the velocity r' to determine an acceleration r" by using Expression (2-18).

$$r'' = \text{DIF}[r'] \quad (2\text{-}18)$$

Figure 36:
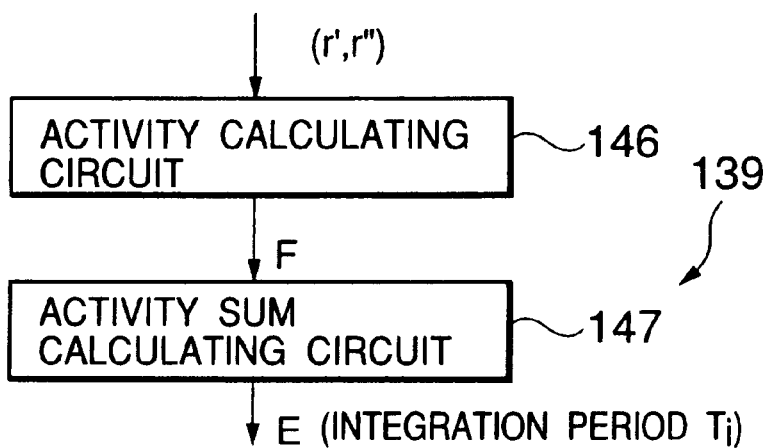
FIG. 36 is a flow chart of assistance in explaining the operation of a second arithmetic circuit.
Figure 37:
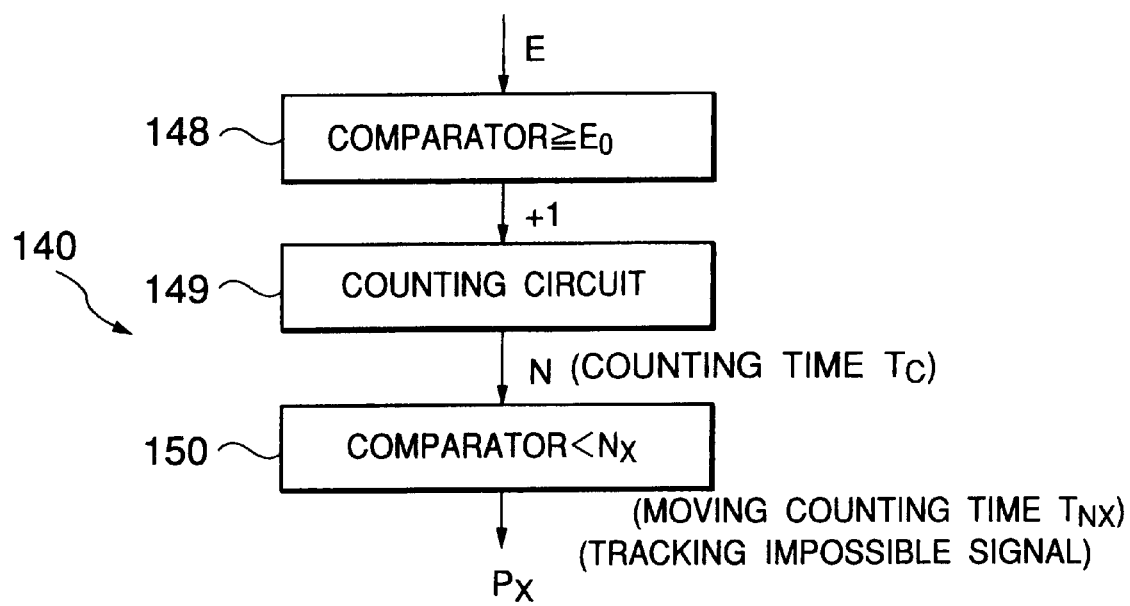
FIG. 37 is a flow chart of assistance in explaining the operation of a third arithmetic circuit.

The second arithmetic circuit 139 receives the velocity r' and the acceleration r" from the first arithmetic circuit 138, and executes an operation shown in FIG. 36 to obtain a characteristic value E. An activity calculating circuit 146 and an activity sum calculating circuit 147 processes the velocity r' and the acceleration r" by using Expressions (2-19) and (2-20) to determine the characteristic value E.

$$F = C \cdot \text{ABS}[r''] + D \cdot \text{MLT}[r'] \quad (2\text{-}19)$$

$$E = \text{INT}[F]^{Ti} \quad (2\text{-}20)$$

where ABS[ ] signifies the operation of a rectifier, MLT[ ] signifies the operation of a square calculator, INT[ ]$^{Ti}$ signifies the operation of an integrator, and C and D are predetermined weighting constants.

The activity F expressed by Expression (2-19) is the sum of the weighted square of the velocity r' and the weighted acceleration r", and is a relative quantity of the same dimension as the quantity of heat of the aquatic organism. The constants C and D are values which can be empirically determined meeting conditions determined on the basis of the relation between conditions of an environment in which the aquatic organism T moves and the movement of the aquatic organism T and are used for equalizing the contributions of the variation of the velocity and the acceleration to the activity F expressed by Expression (2-19). The characteristic value E is an integration of the activity F with respect to time and represents the sum of the activity F in an integration period $T_i$.

In the third arithmetic circuit 140, a comparator 148 compares the characteristic value E (activity sum) with a predetermined value $E_0$ every integration period $T_i$, and generates a pulse of +1 if $E > E_0$. A counting circuit 149 counts the pulses and provides the count N of the pulses in a moving calculation time $T_c$. A comparator 150 receives the count N and gives a tracking impossible signal $P_x$ to the positioning unit 137 of the object tracking device 33 if the count N is not higher than a value $N_X$ for a predetermined moving counting time $T_{NX}$.

If water containing a substance which stimulates the aquatic organism for movement, such as a poisonous substance, is supplied through the water supply pipe 104 into the water tank 132a, the activity of the aquatic organism T increases and the aquatic organism T escapes through the return passage 131a formed by the return members 130 into the downstream water tank 132b. In such a case, the object tracking device 133 is unable to track the aquatic organism T, and the positioning unit 137 moves the stage 134 upon the reception of the tracking impossible signal $P_x$.

Figure 38:
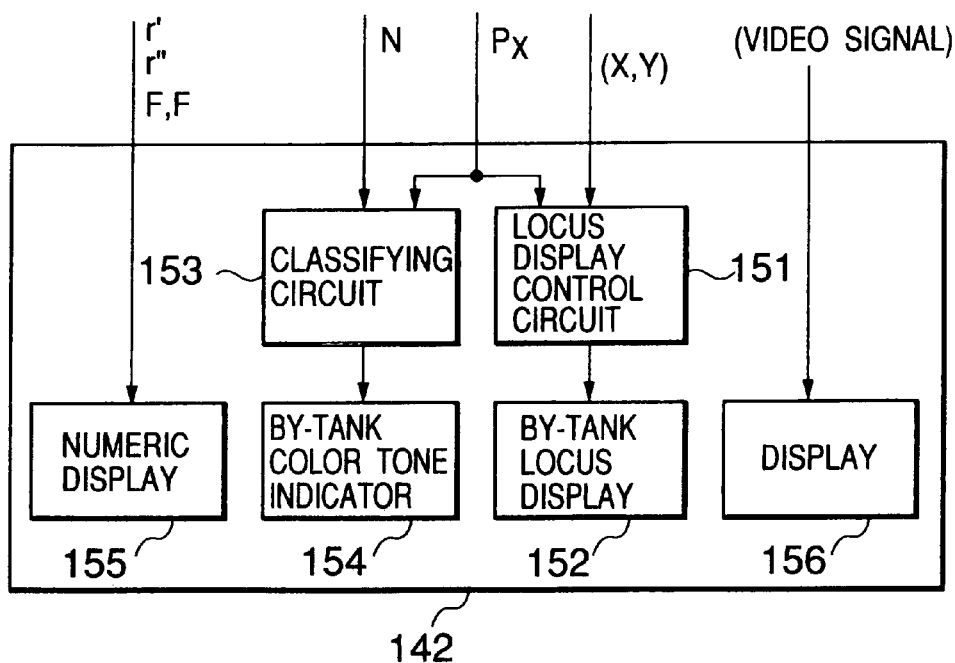
FIG. 38 is a block diagram of a display unit.

Referring to FIG. 38, the display unit 142 receives the position signal (X, Y) provided by the object tracking device 133, the signals representing the time-varying velocity r' and the acceleration r" and provided by the first arithmetic circuit 138, the activity F and the activity sum E provided by the second arithmetic circuit 139, and the count N and the tracking impossible signal $P_x$ provided by the third arithmetic circuit 140, and displays data. The display unit 142 comprises a locus display control circuit 151 for determining the locus of the aquatic organism T in the water tanks 132a, 132b, 132c and 132d in a predetermined display time on the basis of the position signal (X, Y), a by-tank locus display 152 for displaying the output locus of the locus display control circuit 151, a classifying circuit 153 for classifying the counts N provided by the third arithmetic circuit 140, a by-tank color tone indicator 154 for indicating class values provided by the classifying circuit 153 individually for the water tanks, a numeric display 155 for displaying the velocity r', the acceleration r", the activity F and the activity sum E provided by the moving pattern determining unit 141, and a display 156 for displaying images represented by video signals provided by a video camera, not shown, interlocked with the object tracking device 136.

This embodiment may employ water tanks shown in FIG. 39, 40A or 40B instead of the plurality of water tanks 132a, 132b, 132c and 132d partitioned by the partition walls 131. The water tanks 157a, 157b, 157c and 157d shown in FIG. 39 are arranged in a cascading arrangement and are connected sequentially by cascading passages 158 to make an aquatic organism T once escaped into the downstream water tank unable to return to the upstream water tank. In a normal state, the aquatic organism T is kept in the uppermost water tank 157a.

In a modification, water tanks 159a, 159b, 159c and 159d may be arranged in a circular arrangement and may be sequentially connected by cascading passages 158, and an object tracking device 161 provided with a rotating mirror 160 may be disposed in a central region of a space surrounded by the water tanks 159a, 159b, 159c and 159d. FIG. 40B is a sectional view taken on line B—B in FIG. 40A. As shown in FIG. 40B, the rotating mirror 160 is fixedly mounted on a rotary stage 162, the rotary stage 162 can be turned by a rotative driving device 163 to determine the orientation of the rotating mirror 160 relative to the water tanks 159a to 159d by a positioning device 164. An object tracking device 165 is fixedly held above the rotating mirror 160. Upon the reception of the tracking impossible signal $P_x$ from the third arithmetic circuit 140, the positioning device 164 controls the rotative driving device 163 to turn the rotary stage 162 to determine the orientation of the rotating mirror 160 relative to the water tanks 159a to 159d.

Thus, according to the present invention, the moving pattern of the aquatic organism moving in the plurality of water tanks can be accurately found in a short time, so that the variation of water quality can be quickly detected.

Third Embodiment

First, a general idea of moving pattern determining apparatuses in embodiments 3-1 and 3-2 will be explained.

Figure 41:
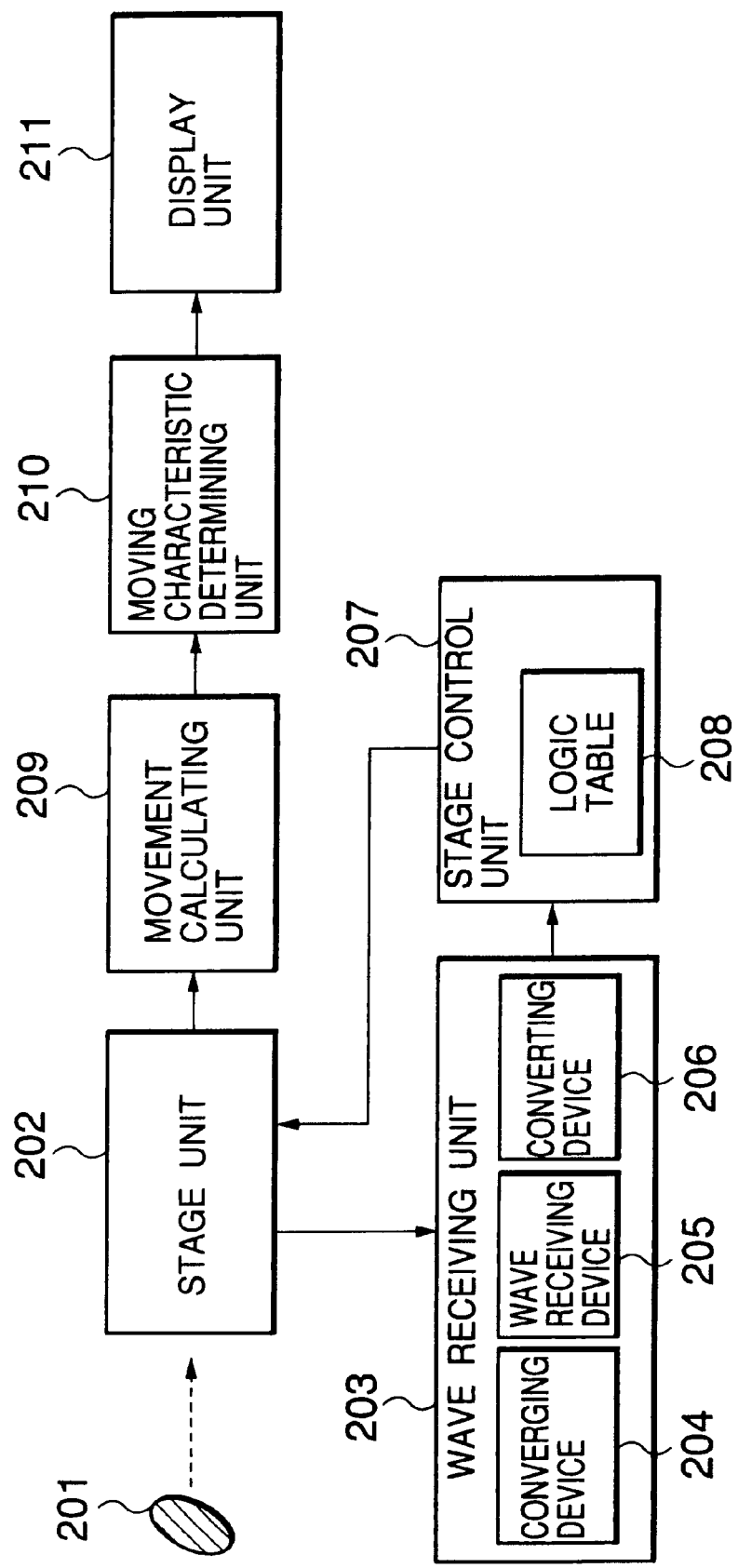
FIG. 41 is a block diagram of a moving pattern determining apparatus in an embodiment 3-1 according to the present invention.

Referring to FIG. 41, the moving pattern determining apparatus in an embodiment 3-1 comprises a stage unit 202 capable of varying its attitude relative to a moving object 201 and of receiving a wave generated by the moving object 201, a wave receiving unit 203 storing a plurality of pieces of position information about the positions of the moving object 201 and capable of providing position information signals sequentially in response to the reception of the wave generated by the moving object 201 from the stage unit 202, a stage control unit 207 storing values of a manipulated variable corresponding to a plurality of pieces of position information and capable of properly controlling the attitude of the stage unit 202 relative to the moving object 201 by giving a control signal corresponding to a value of a manipulated variable corresponding to a position information signal received from the wave receiving unit 203, a movement calculating unit 209 which receives a displacement by which the stage unit 202 is moved under the control of the stage control unit 207 and calculates a movement of the moving object 201, a moving characteristic determining unit 210 which stores beforehand moving characteristic information about the movement of the moving object 201 and finds the moving characteristic of the moving object 201 on the basis of the moving characteristic information and the results of calculation provided by the movement calculating unit 209, a display unit 211 which provides an alarm or displays an alarm when the moving characteristic determining unit 210 finds that the moving characteristic of the moving object 201 is abnormal.

The wave receiving unit 203 comprises a converging device 204 which receives and converges the wave generated by the moving object 201 and sent thereto from the stage unit 202, a wave receiving device comprising a plurality of image sensing elements which convert an image of the wave converged by the converging device 204 into an electrical signal corresponding to the intensity of the wave, and a converting device 206 which subjects the electrical signals given thereto by the image detecting elements of the wave receiving device 205 to A/D conversion using a predetermined threshold and provides on/off electric signals produced by the A/D conversion as the position information signals. The stage control unit 207 is provided with a logic table 208 tabulating values of a manipulated variable corresponding to a plurality of pieces of position information about positions of the moving object 201, and determines control signals corresponding to position information signals sequentially given thereto by the wave receiving unit 203 by using the logic table 208.

Figure 42:
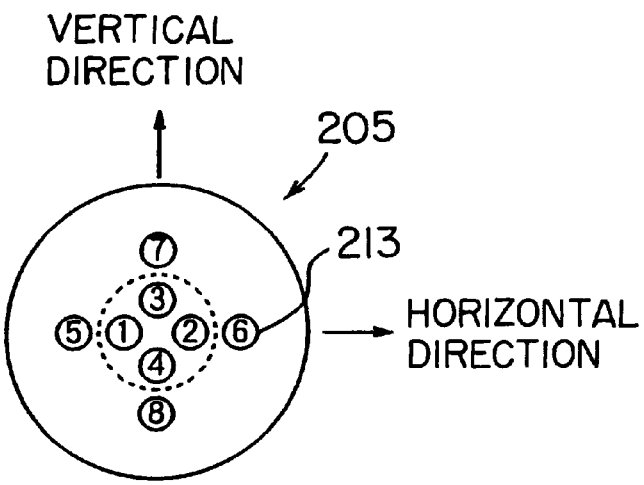
FIG. 42 is a typical view of assistance in explaining the arrangement of image sensing elements in a wave receiving device included in the moving pattern determining apparatus of FIG. 41.

FIG. 42 shows the arrangement of the image sensing elements 213 of the wave receiving device 205. The plurality of wave detecting elements 213 are, for example, photodiodes and element numbers are assigned to the image sensing elements 213. As shown in FIG. 42, the image sensing elements Nos. 1 to 4 of a first group are arranged in a central region of an image converging surface, the image sensing elements Nos. 5 to 8 of a second group are arranged around the first group. The image sensing elements Nos. 5, 1, 2 and 6 are among the image sensing elements Nos. 1 to 8 are arranged horizontally, and the image sensing elements Nos. 7, 3, 4 and 8 arranged vertically.

Figure 43:
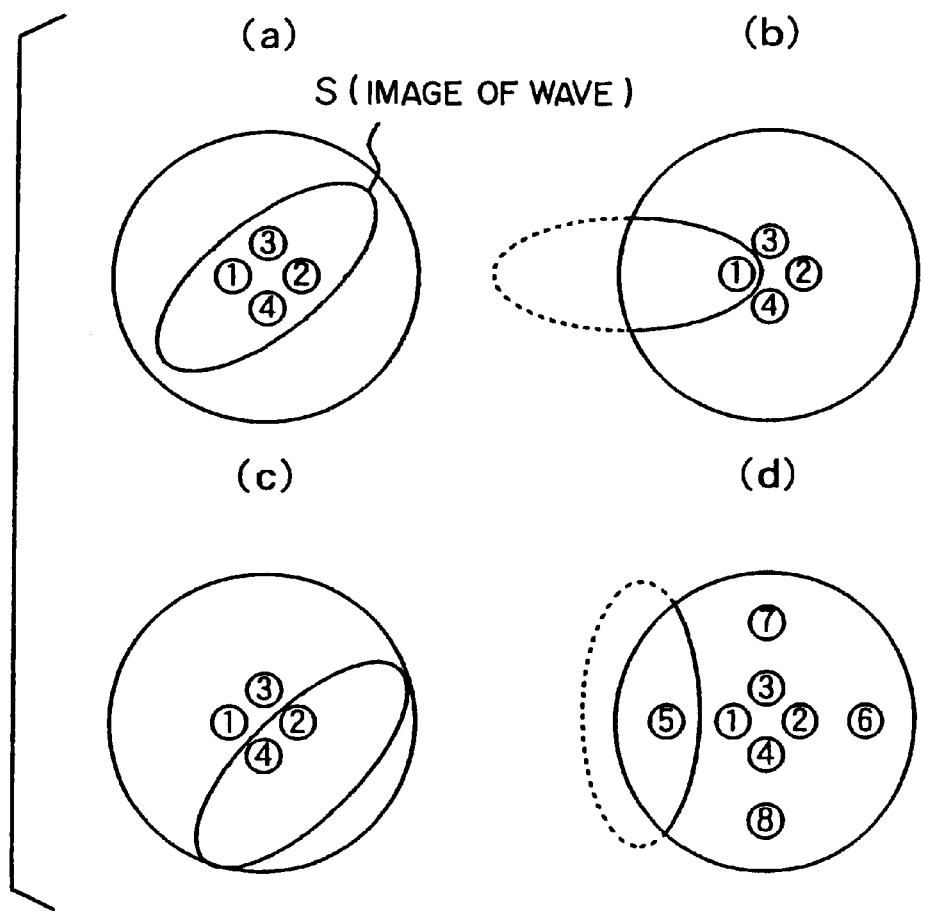
FIG. 43 is typical view of assistance in explaining the basic operations of the moving pattern determining apparatus of FIG. 41.

In a state where a wave image s of the moving object 201 covers all the image sensing elements Nos. 1 to 4 as shown in FIG. 43(a), the stage control unit 207 does not change the attitude of the stage unit 202. In a state where the wave image s only the image sensing element No. 1 as shown in FIG. 43(b), the stage control unit 207 moves the stage unit 202 to the left, as viewed in FIG. 43(b). In a state where the wave image s covers only the image sensing elements Nos. 2 and 4 as shown in FIG. 43(c), the stage control unit 207 moves the stage unit 202 to the right and downward as viewed in FIG. 43(c). In a state where the wave image s covers only the image sensing element No. 5 as shown in FIG. 43(d), the stage control unit 207 moves the stage unit 202 to the left as viewed in FIG. 43(d).

In the embodiment 3-1, the stage control unit 207 controls the attitude of the stage unit 202 so that the wave image s of the moving object 201 is formed always in the central region of the converging surface of the wave receiving device 205. Accordingly, the moving object 201 moving at a high velocity can be tracked without delay.

Figure 44:
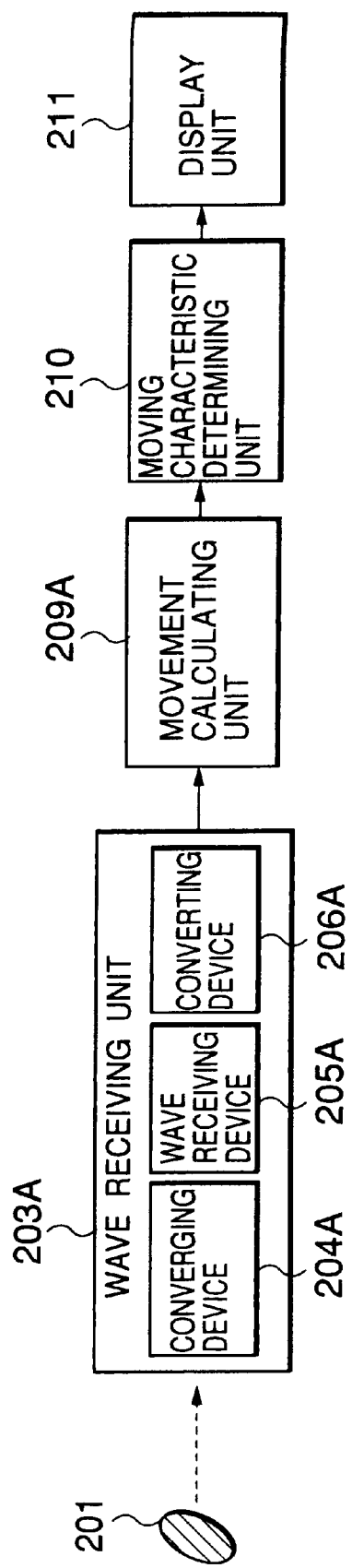
FIG. 44 is a block diagram of a moving pattern determining apparatus in an embodiment 3-2 according to the present invention.

Referring to FIG. 44, the moving pattern determining apparatus in an embodiment 3-2 comprises a wave receiving unit 203A which receives a wave generated by a moving object 201 and provides position information signals indicating positions of the moving object 201 sequentially, a movement calculating unit 209A which calculates a movement of the moving object 201 on the basis of position information signals received from the wave receiving unit 203A, and a moving characteristic determining unit 210 and a display unit 211. The moving characteristic determining unit 210 and the display unit 211 are the same in constitution and function as those shown in FIG. 41.

The wave receiving unit 203A comprises a converging device 204A which receives and converges the wave generated by the moving object 201, a wave receiving device 205A comprising a plurality of image sensing elements which convert an image of the wave converged by the converging device 204 into an electrical signal corresponding to the intensity of the wave, and a converting device 206A which receives electric signals generated by the image sensing elements of the wave receiving device 205A arranged in horizontal and vertical rows, and provides a position information signal indicating the number of the image sensing element which provided the electric signal representing a part of the wave of the highest intensity.

Figure 45:
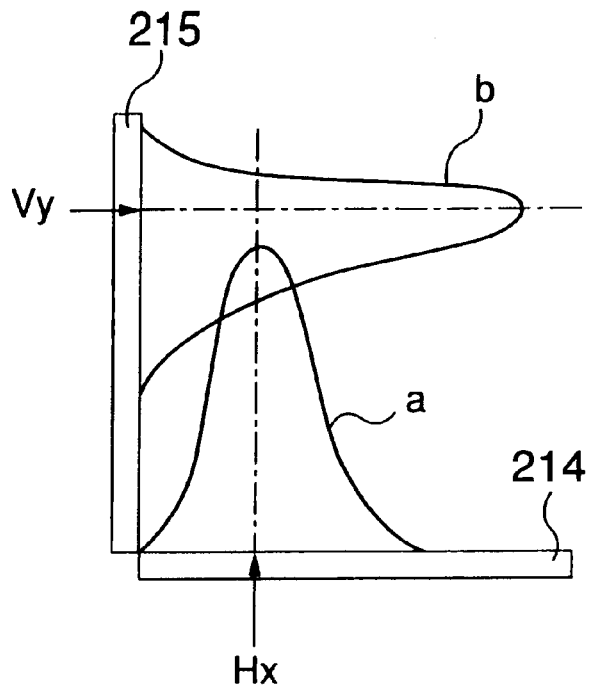
FIG. 45 is a diagram of assistance in explaining the arrangement of a horizontal row of image sensing elements and a vertical row of image sensing elements in a wave receiving device included in the moving pattern determining apparatus of FIG. 44.

FIG. 45 shows the horizontal row 214 of the image sensing elements and the vertical row 215 of the image sensing elements. The image sensing elements are, for example, photodiodes. In FIG. 45, curves a and b indicate wave intensity distributions, such as luminance distributions, of the horizontal row 214 and the vertical row 215, respectively, and $H_x$ and $V_y$ indicate positions of the image sensing elements provided the electric signals indicating the highest wave intensity on the horizontal row 214 and the vertical row 215, respectively. Thus, the position of the moving object 201 in a space defined by a two-dimensional coordinate system set for the wave receiving device 205A is indicated by coordinates ($H_x$, $V_y$). The movement calculating unit 209A receives and processes signals representing the coordinates ($H_x$, $V_y$) sequentially to calculate the movement of the moving object 201.

The embodiment 3-2 is different in configuration from the embodiment 3-1 and does not employ any mechanical device like the stage unit 202 which operates at a relatively low response speed. Therefore, although the possible region of detection covered by the embodiment 3-2 is narrower than that can be covered by the embodiment 3-1, the tracking speed of the embodiment 3-2 is far higher than that of the embodiment 3-1.

The respective configurations of the embodiments 3-1 and 3-2 will be more concretely described hereinafter.

Figure 47:
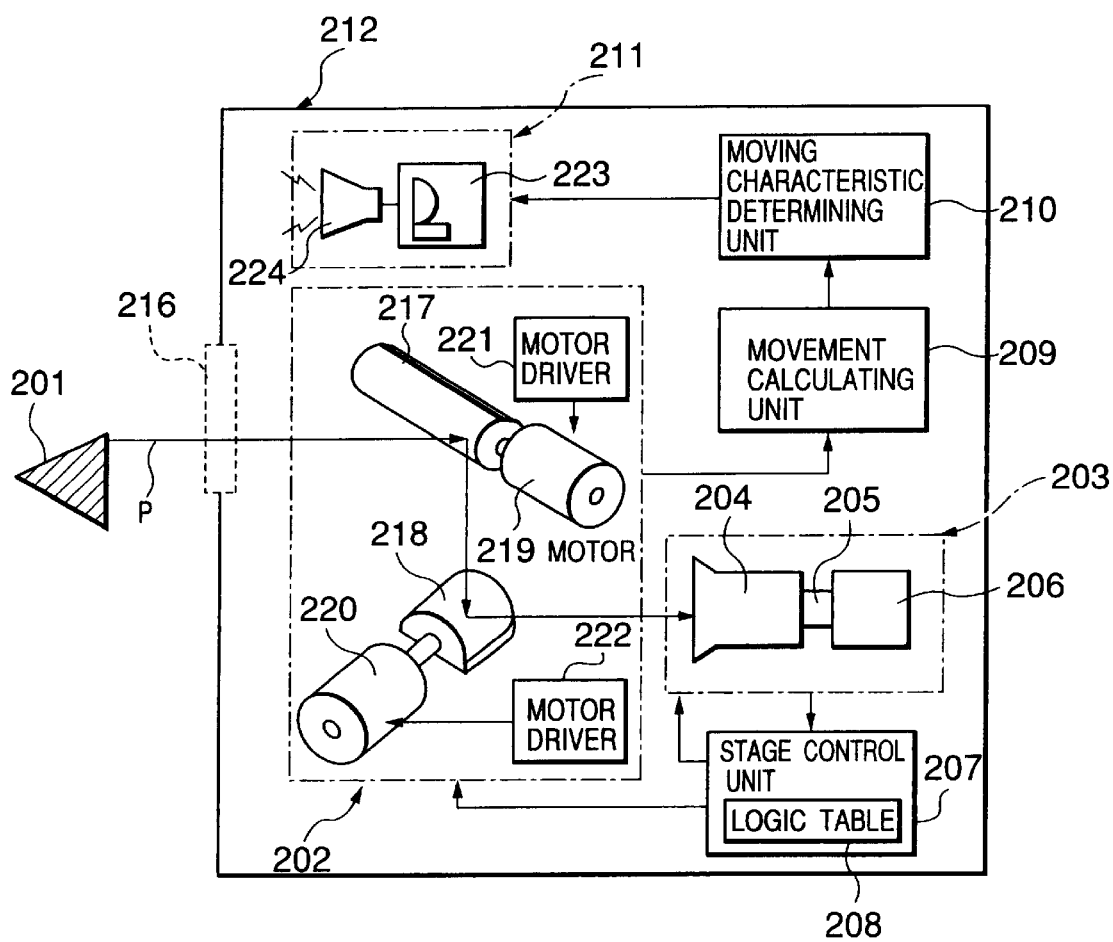
FIG. 47 is a block diagram of a moving object detecting apparatus corresponding to the moving pattern determining apparatus of FIG. 41.

FIG. 47 shows, in a block diagram, a moving object detecting apparatus 212 of the configuration shown in FIG. 41. The moving object detecting apparatus 212 has a main case provided with a window 216 and containing the stage unit 202, the wave receiving unit 203, the stage control unit 207, the movement calculating unit 209, the moving characteristic determining unit 210 and the display unit 211.

The stage unit 202 employs a two-axis optical mechanism, and comprises a first cylindrical rotating mirror 217 having a horizontal axis of rotation horizontally extending with respect to the moving region in which the moving object 201 moves, and a second cylindrical rotating mirror 218 having a vertical axis of rotation vertically extending with respect to the moving region in which the moving object 201 moves. The cylindrical rotating mirrors 217 and 218 are driven by motors 219 and 220 for rotation, respectively, and the motors 219 and 220 are controlled by motor drivers 221 and 222, respectively. Light rays P traveling from the moving object 201 through the window 216 fall on the rotating mirror 217, the rotating mirror 217 reflects the light rays P toward the rotating mirror 218, and then the rotating mirror 218 reflects the light rays P toward the converging device 204 of the wave receiving unit 203.

The converging device 204 of the wave receiving unit 203 is a zoom lens. The zoom lens focuses the light rays P. The wave receiving device 205 is disposed behind the converging device 204. The eight image sensing elements 213, i.e., the image sensing elements Nos. 1 to 8, are arranged in a region of the converging surface near the focal point of the zoom lens as shown in FIG. 42. The converting device 206 is disposed behind the wave receiving device 205. The converting device 206 has an analog amplifier, not shown, for amplifying an electric signal received from the wave receiving device 205, and an A/D converter, not shown, provided with an input terminal to which a predetermined threshold defining the minimum level for A/D conversion is applied.

The stage control unit 207 provided with the logic table 208 receives on/off electric signals from the converting device 206 of the wave receiving unit 203 and controls the stage unit 202. FIG. 48 shows the contents of the logic table 208. The stage control unit 207 controls the position of the stage unit 202 with respect to the horizontal direction and the focal length of the zoom lens by using sixteen combinations of on-state and off-state of the image sensing elements Nos. 5, 1, 2 and 6. The stage control unit 207 controls the position of the stage unit 202 with respect to the vertical direction and the focal length of the zoom lens by using sixteen combinations of on-state and off-state of the image sensing elements Nos. 7, 3, 4 and 8. Priority is given to focal length control for controlling the focal length of the zoom lens. If either of a state represented by the conditions of the image sensing elements on the horizontal row and a state represented by the conditions of the image sensing elements on the vertical row indicates a need for focal length control and the other state does not indicate any need for focal length control, a focal length control operation is carried out to change the focal length of the zoom lens.

When the attitude of the stage unit 202 with respect to the horizontal and the vertical direction is changed by the stage control unit 207, the motor drivers 221 and 222 give signals corresponding to the displacement of the stage unit 202 to the movement calculating unit 209. Then, the movement calculating unit 209 calculates a horizontal displacement $\Delta x$ and a vertical displacement $\Delta y$ by using the signals received from the motor drivers 221 and 222 and Expressions (3-1) and (3-2). In Expressions (3-1) and (3-2), $\Delta X$ is an angular displacement of the rotating mirror 217 having a horizontal axis of rotation and $\Delta Y$ is an angular displacement of the rotating mirror 218 having a vertical axis of rotation, A is a constant dependent on the characteristics of the cylindrical rotating mirrors 217 and 218, L is distance between the moving object 201 and the apparatus, and $T_s$ is sampling period. Thus, the constants A, L and $T_s$ are predetermined values characteristic of the apparatus.

$$\Delta x = \{A \cdot L \cdot \tan(\Delta X)\}/T_s \qquad (3\text{-}1)$$

$$\Delta y = \{A \cdot L \cdot \tan(\Delta Y)\}/T^s \qquad (3\text{-}2)$$

Figure 46:
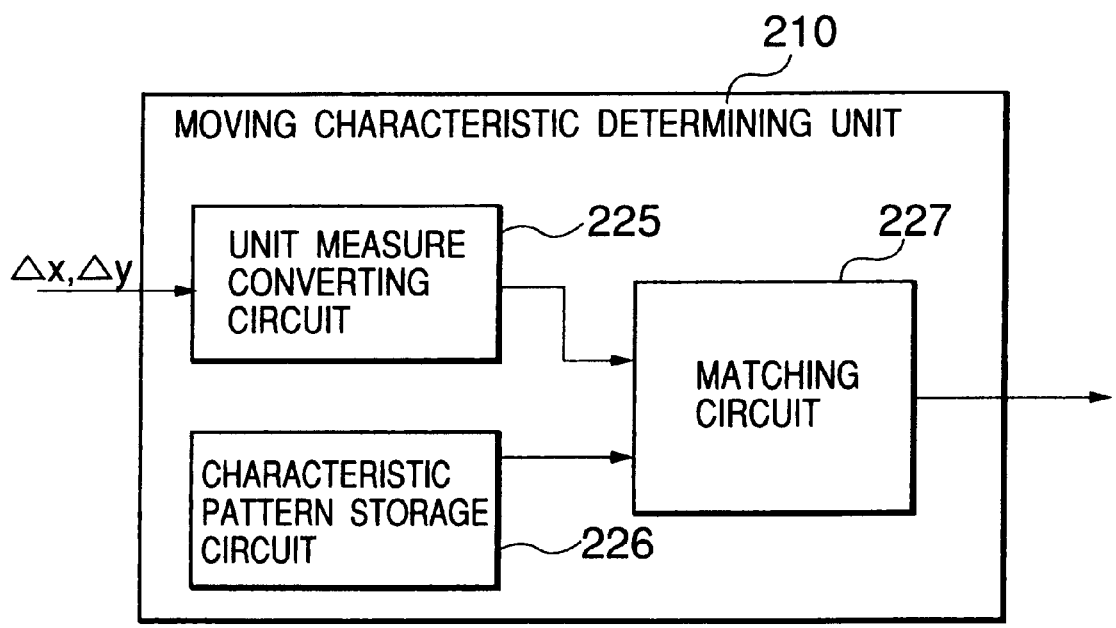
FIG. 46 is a block diagram of a moving characteristic determining device employed in the moving pattern determining apparatuses of FIGS. 41 and 44.

The horizontal displacement $\Delta x$ and the vertical displacement $\Delta y$ calculated by the movement calculating unit 209 are given to the moving characteristic determining unit 210 shown in FIG. 46. The moving characteristic determining unit 210 comprises a unit measure converting circuit 225, a characteristic pattern storage circuit 226, and a matching circuit 227. The unit measure converting circuit 225 receives the horizontal displacement $\Delta x$ and the vertical displacement $\Delta y$ from the movement calculating unit 209, and executes calculations by using Expressions (3-3) to (3-7).

Geometric means:

$$\Delta z = \{(\Delta x)^2 + (\Delta y)^2\}^{1/2} \qquad (3\text{-}3)$$

Ratio:

$$\Delta R = \Delta y / \Delta x \qquad (3\text{-}4)$$

Difference:

$$(\nabla x, \nabla y) = \{(\Delta x_2 - \Delta x_1), (\Delta y_2 - \Delta y_1)\} \text{tm (3-5)}$$

where $\Delta x_1$ and $\Delta y_1$ are displacements calculated in the present calculation cycle, and $\Delta x_2$ and $\Delta y_2$ are displacements calculated in the preceding calculation cycle.

Geometric means of the difference:

$$\nabla z = \{(\nabla x)^2 + (\nabla y)^2\}^{1/2} \qquad (3\text{-}6)$$

Geometric mean of higher order:

$$\Delta E = \{(\nabla Z_1)^2 + (\nabla Z_2)^2\}^{1/2} \qquad (3\text{-}7)$$

Unit measures expressed by Expressions (3-3) to (3-7) express the basic characteristic of the moving object 201. For example, the geometric means Δz indicates only the magnitude of displacement, i.e., the velocity of the moving object 201, the ratio ΔR indicates directions of the movement of the moving object 201 in a two-dimensional space with respect to four directions along a vertical axis and a horizontal axis.

A plurality of characteristic patterns are stored beforehand in the characteristic pattern storage circuit 226. An upper limit and a lower limit are determined by the unit measures provided by the unit measure converting circuit 225 for each characteristic pattern, and the characteristic pattern is expressed by a plurality of logical expressions which regards a region between the upper and the lower limit as a positive region, and regards regions other than the region between the upper and the lower limit as negative regions. For example, it is known that the moving object 201 is moving vertically at a medium velocity if the characteristic-pattern is expressed by Expression (3-8).

$$(Z_{min} \leq \Delta z \leq Z_{max}) \& (\Delta R \geq R_{max}) \| (\Delta R \leq R_{min}) \& R \qquad (3\text{-}8)$$

The matching circuit 227 receives unit measure signals sequentially from the unit measure converting circuit 225, tries to find a characteristic pattern coinciding with the moving pattern among the plurality of characteristic patterns by matching and, if the matching is successful, provides a code indicating the characteristic pattern coinciding with the moving pattern.

The moving characteristic determining unit 210 gives the result of determination to the display unit 211. The display unit has a display 223 which displays the result of determination and an alarm device 224 which generates an alarm if the result of determination indicates that the moving pattern is abnormal.

The operation of the embodiment 3-1 will be described hereinafter. Referring to FIG. 47, suppose that light rays P from the moving object 201 travels through the window 216 and falls on the rotating mirror 217, are reflected by the rotating mirror 217 toward the rotating mirror 218, are reflected by the rotating mirror 218, and fall on the converging device 204. Some of the image sensing elements 213 of the wave receiving device 205 receive the light rays P and generates electric signals, and the converting device 206 gives on/off electric signals to the stage control unit 207 upon the reception of the electric signals from the image sensing elements 213.

The stage control unit 207 controls the attitude of the stage unit 202 with respect to the horizontal and the vertical direction and the zooming operation of the converging device 204 on the basis of the on/off electric signals and the contents of the logic table 208. For example, if an image s covers only the image sensing elements Nos. 5, 1, 2, 7 and 3 in FIG. 43(*d*), the stage control unit 207 refers to the logic table 208 shown in FIG. 48, reads a displacement "n" for a case C$_2$, i.e., a value of a manipulated variable for horizontal shifting, to shift the stage unit 202 horizontally, and reads a control contents "W" for controlling the zooming operation of the converging device 204. Furthermore, the stage control unit 207 reads a displacement "U" for a case C$_3$, i.e., a value of a manipulated variable for vertical shifting, to shift the stage unit 202 vertically, and reads a control contents "n" for controlling the zooming operation of the converging device 204. From the contents of the logic table 208, the stage control unit 207 does not shift the stage unit 202 horizontally, shifts the stage unit 202 vertically upward and reduces the magnification of the zoom lens of the converging device 204.

The motor drivers 221 and 222 control the motors 219 and 220 according to control signals received from the stage control unit 207 to turn the rotating mirrors 217 and 218 accordingly. Values of manipulated variables applied to the motor drivers 221 and 222 are given to the movement calculating unit 209. Then, the movement calculating unit 209 calculates horizontal displacement Δx and vertical displacement Δy using Expressions (3-1) and (3-2) and gives the horizontal displacement Δx and the vertical displacement Δy to the moving characteristic determining unit 210. The unit measure converting circuit 225 of the moving characteristic determining unit 210 calculates necessary ones of the unit measures expressed by Expressions (3-3) to (3-7) on the basis of the horizontal displacement Δx and the vertical displacement Δy, and gives the results of calculation to the matching circuit 227.

The matching circuit 227 matches a moving pattern represented by the results of calculation made by the unit measure converting circuit 225 with characteristic patterns stored in the characteristic pattern storage circuit 226 to find a characteristic pattern coinciding with the moving pattern and, if the matching is successful, gives a code indicating the characteristic pattern coinciding with the moving pattern to the display unit 211. The display 223 of the display unit 211 displays the code of the characteristic pattern. If the matching carried out by the matching circuit 227 is unsuccessful, the matching circuit 227 gives an error signal to the display unit 211. Upon the reception of the error signal, the display unit 211 makes the display 223 display an alarm giving notice of occurrence of an abnormal state and makes the alarm device 224 generate an alarm signal to call operator's attention. Unsuccessful matching occurs, for example, when a creature kept in a space is dead and does not move at all.

The moving object detecting apparatus in the embodiment 3-1 is able to find the position of the moving object 201 quickly because the number of the image sensing elements employed in the wave receiving device 205 is relatively small. Thus, the moving object detecting apparatus in the embodiment 3-1 having a simple configuration is capable of detecting the moving object 201 moving at high velocities and of accurately finding the moving pattern of the moving object 201. Particularly, since the image sensing elements 213 are divided in the inner group and the outer group as shown in FIG. 42, the image sensing elements of the outer group are able to sense the image of the moving object 201 even if the moving object 201 is outside a region covered by the image sensing elements of the inner group. Therefore, the moving object 201 is always kept in sight and can be continuously tracked. Since the attitude of the stage unit 202 can be freely and quickly controlled to track the moving object 201, the moving region of the moving object 201 which can be covered by the moving object detecting apparatus is not limited to a narrow region, and the moving pattern of the moving object 201 moving at high velocities in a wide, free space can be found.

The rotating mirrors 217 and 218, i.e., cylindrical convex mirrors, disposed substantially perpendicularly to each other may be substituted by flat mirrors or spherical mirrors.

Figure 49:
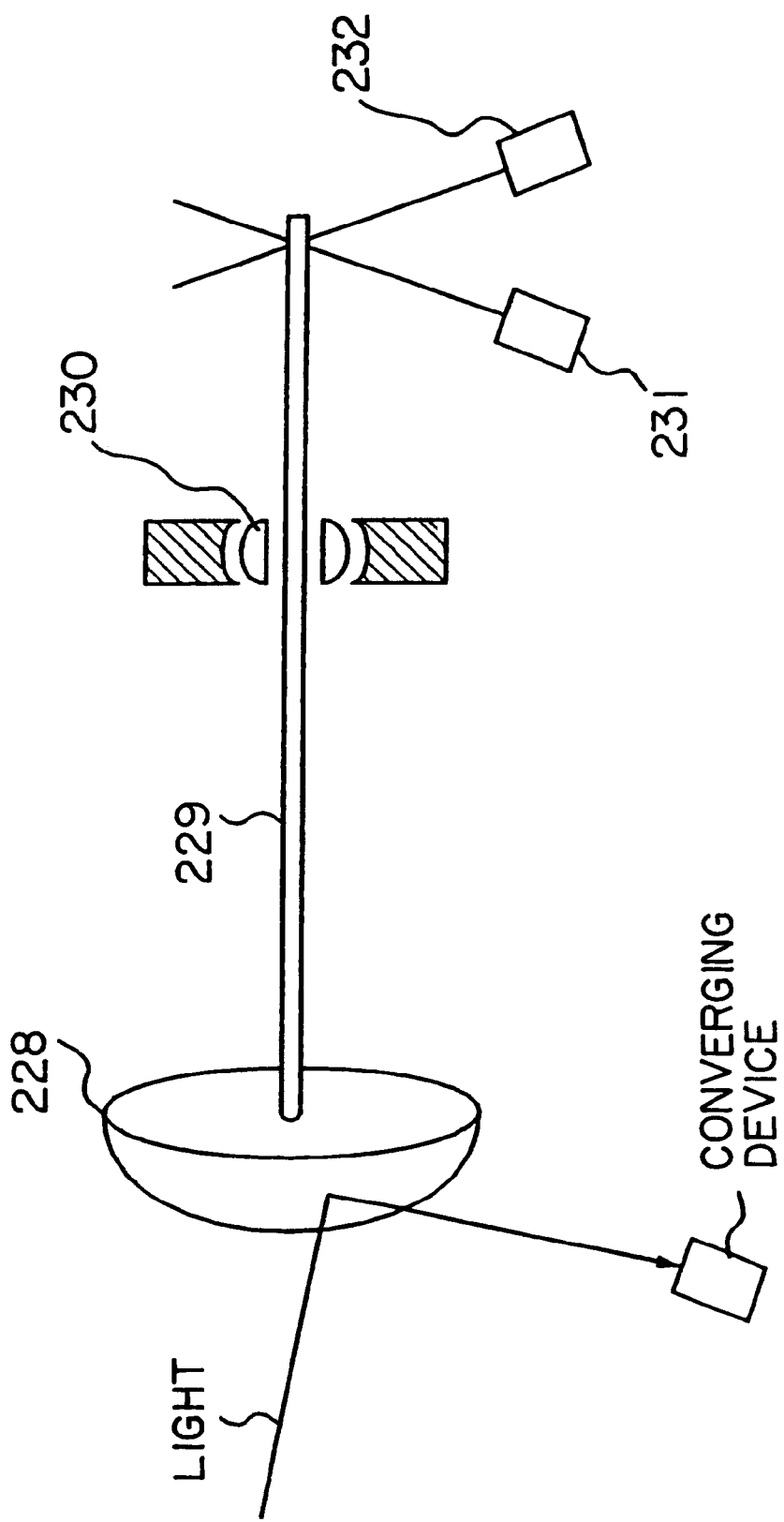
FIG. 49 is a stage unit in a modification of a stage unit included in the moving object detecting apparatus of FIG. 47.

FIG. 49 illustrates a stage unit 202 provided with a spherical mirror 228. The spherical mirror 228 is supported on one end of a rotating shaft 229 to reflect light rays from a moving object toward a converging device. A middle portion of the rotating shaft 229 is supported in a spherical bearing 230, and a tilt actuator 231 and a pan actuator 232 are connected to the other end of the rotating shaft 229. The tilt actuator 231 tilts the spherical mirror 228 in a vertical plane, and the pan actuator 232 turns the spherical mirror 228 in a horizontal plane. Various constructions for the stage unit 202 are possible.

Although the wave receiving unit 203 of the embodiment 3-1 employs the zoom lens having variable focal length as the converging device 204, an optical lens in which only focal length is adjustable may be employed if the purpose of the moving object detecting apparatus permits to form the moving object detecting apparatus in an inexpensive construction.

The photodiodes employed as the image sensing elements 213 in the wave receiving device 205 of the embodiment 3-1 may be either half-split photodiodes or nonsplit photodiodes. Usually, the photodiodes are those sensitive to visible light rays. However, the photodiodes may be those sensitive to ultraviolet rays, infrared lays or laser light rays depending on the purpose of the moving object detecting apparatus.

Figure 50:
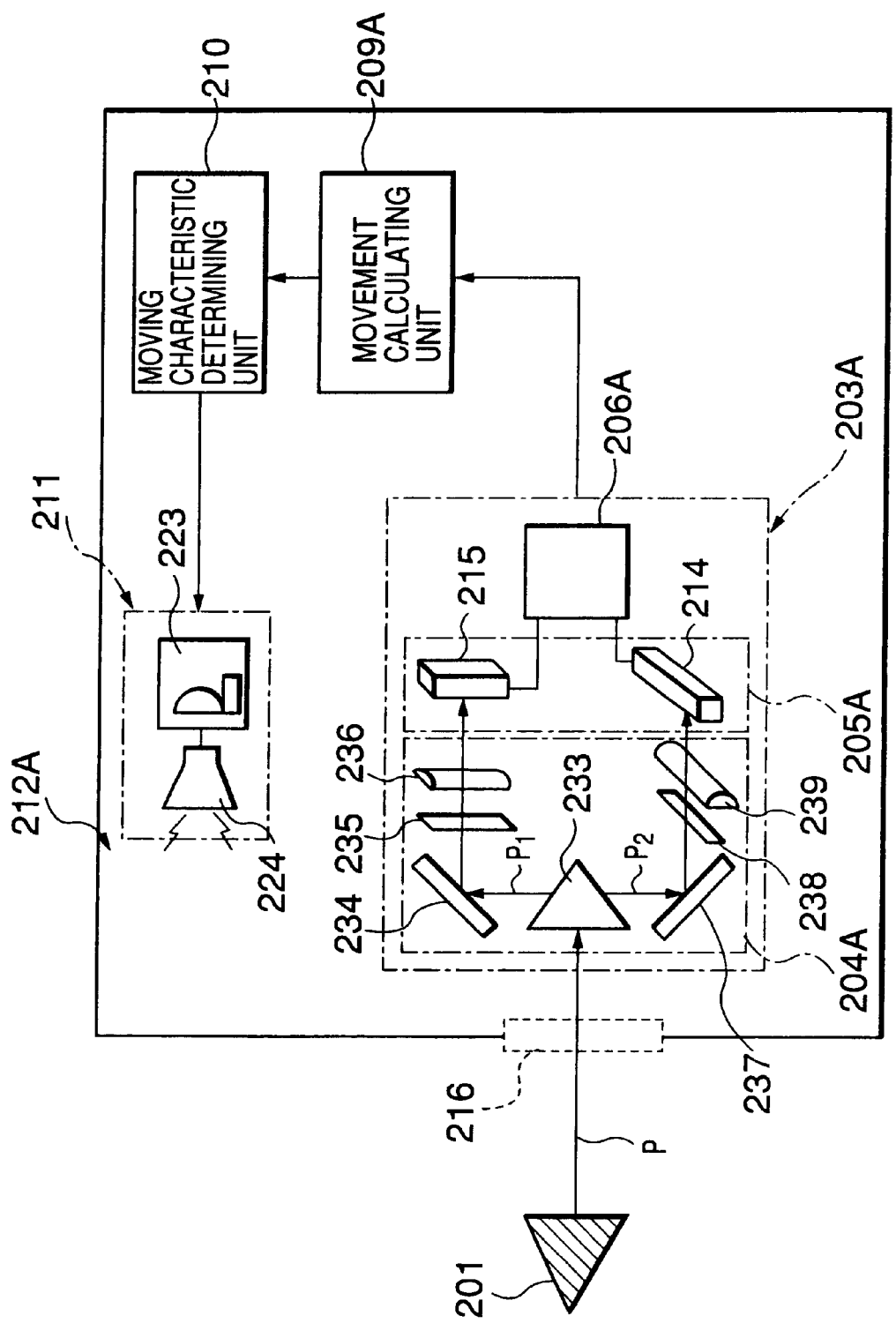
FIG. 50 is a block diagram of a moving object detecting apparatus corresponding to the stage unit of FIG. 49.

FIG. 50 shows, in a block diagram, a moving object detecting apparatus 212A of the configuration shown in FIG. 44. The moving object detecting apparatus 212A has a main case provided with a window 216 and containing the wave receiving unit 203A, the movement calculating unit 209A, the moving characteristic determining unit 210 and the display unit 211.

A converging device 210 included in the wave receiving unit 203A comprises a beam splitter 233, a reflecting mirrors 234 and 237, slit plates 235 and 238, and cylindrical lenses 236 and 239. The wave receiving device 205A has the horizontal row 214 of the image sensing elements and the vertical row 215 of the image sensing elements shown in FIG. 45. Each of the horizontal row 214 and the vertical row 215 has sixteen or one hundred and twenty-eight photodiodes. The converting device 206A receives luminance signals from the photodiodes of the horizontal row 214 and the vertical row 215, and gives position signals indicating positions of the moving body 201 to the movement calculating unit 209A, and the movement calculating unit 209A calculates a movement by which the moving object 201 has moved on the basis of the position signals. The functions and operations of the moving characteristic determining unit 210 and the display unit 211 are the same as those of the moving characteristic determining unit 210 and the display 211 shown in FIG. 47 and hence the description thereof will be omitted.

The operation of the moving object detecting apparatus in the embodiment 3-2 will be described with reference to FIG. 50. Light rays P from the moving object 201 travels through the window 216 and fall on the beam splitter 233 of the converging device 204A. The beam splitter 233 splits the light rays P into light rays $P_1$ and $P_2$. The light rays $P_1$ are reflected by the reflecting mirror 234, travel through the slit plates 235 and the cylindrical lens 236, and fall on the photodiodes of the vertical row 215 of the converting device 206A. The light rays $P_2$ are reflected by the reflecting mirror 237, travel through the slit plates 238 and the cylindrical lens 239, and fall on the photodiodes of the horizontal row 214 of the converting device 206A.

The photodiodes of the horizontal row 214 and the vertical row 215 give luminance signals to the converting device 206A. The converting device 206A determines a position ($H_x$, $V_y$) of the moving object 201 from the luminance distributions on the horizontal row 214 and the vertical row 215 by the method as described previously with reference FIG. 45, and gives a position signal indicating the position ($H_x$, $V_y$) to the movement calculating unit 209A.

The movement calculating unit 209A receives position signals from the converting device 206A and calculates horizontal displacement $\Delta x$ and vertical displacement $\Delta y$ every predetermined period $T_s$ (sec) by using Expressions (3-9) and (3-10). In Expressions (3-9) and (3-10), $H_{x1}$ and $V_{y1}$ are coordinates indicating a position determined in the present calculation cycle, $H_{x2}$ and $V_{y2}$ are coordinates indicating a position determined in the preceding calculation cycle, and b is an augmenting factor.

$$\Delta x = b \cdot (H_{x2} - H_{x1})/T_s \qquad (3\text{-}9)$$

$$\Delta y = b \cdot (V_{y2} - V_{y1})/T_s \qquad (3\text{-}10)$$

Since the moving object detecting apparatus in the embodiment 3-2 is not provided with any mechanical unit like the stage unit 202 of the moving object detecting apparatus in the embodiment 3-1, the former apparatus is able to achieve the tracking of the moving object 201 moving at high velocities more accurately and more quickly than the latter apparatus. For example, whereas a moving object detecting apparatus employing a CCD camera, which is considered to be the highest-speed moving object detecting apparatus, needs an idle time of a level on the order of at least several hundreds of milliseconds before the same starts a tracking operation after the reception of a wave from a moving object, the second embodiment is able to reduce the idle time to a level on the order of several hundreds of microseconds. However, the embodiment 3-2 does not control the attitude of the wave receiving unit 203A, the moving object 201 can be detected only when the moving object 201 is in a limited detection region. If it is desired not to place restrictions on the possible detection region even if the tracking speed needs to be reduced, the moving object detecting apparatus 212A may-be mounted on a stage mechanism.

Although either of the embodiments 3-1 and 3-2 is able to detect the moving object in a two-dimensional region, the position and the movement of the moving object 201 in a three-dimensional region can be determined if two or more moving object detecting apparatuses in accordance with the present invention are used.

As is apparent from the foregoing description, the moving object detecting apparatus according to the present invention has a simple construction, and is capable of accurately detecting a rapidly moving object and of accurately determining the moving pattern of the rapidly moving object.

What is claimed is:

1. A moving pattern determining apparatus comprising:
    object tracking means for tracking a moving object and providing a position signal indicating a position of the object;
    positional time-variation calculating means for calculating a positional time-variation of the object on the basis of the position signal from the object tracking means;
    moving characteristic value calculating means for calculating a moving characteristic value representing a movement of the object on the basis of the positional time-variation provided by the positional time-variation calculating means; and
    moving pattern determining means for determining a moving pattern of the object on the basis of the moving characteristic value provided by the moving characteristic calculating means.

2. The moving pattern determining apparatus according to claim 1, wherein
    the positional time-variation calculating means determines a velocity and an acceleration of the object.

3. The moving pattern determining apparatus according to claim 1, wherein the moving characteristic value calculating means determines the moving characteristic value by using a numerical model including the positional time-variation of the object.

4. The moving pattern determining apparatus according to claim 3, wherein the positional time-variation calculating means determines a velocity and an acceleration of the object, and the numerical model employed in the moving characteristic value calculating means consists of the sum of a weighted velocity and a weighted acceleration.

5. The moving pattern determining apparatus according to claim 3, wherein the positional time-variation calculating means determines a velocity and an acceleration of the object, and the numerical model employed in the moving characteristic value calculating means consists of the sum of a weighted square of velocity and a weighted acceleration.

6. The moving pattern determining apparatus according to claim 1, wherein the moving characteristic value calculating means uses a dynamic model of the object using positional time-variation of the object for determining the moving characteristic value.

7. The moving pattern determining apparatus according to claim 1, wherein the positional time-variation calculating means determines a velocity and an acceleration of the object eliminated of time elements, and the moving characteristic value calculating means forms a predetermined a pattern on a space defined by a polar coordinate system on the basis of the velocity and the acceleration of the object to determine the moving characteristic value.

8. The moving pattern determining apparatus according to claim 1, wherein the moving characteristic value calculating means determines a predicted positional time-variation on the basis of the positional time-variation of the object, and determines the moving characteristic value from the difference between the predicted positional time-variation and an actual positional time-variation.

9. The moving pattern determining apparatus according to claim 8, wherein the moving characteristic value calculating means determines the predicted positional time-variation on the basis of positional time-variation of the object by regression analysis.

10. The moving pattern determining apparatus according to claim 8, wherein the moving characteristic value calculating means determines the predicted positional time-variation on the basis of the positional time-variation of the object by using a learning model.

11. The moving pattern determining apparatus according to claim 1, wherein the moving characteristic value calculating means determines the moving characteristic value on the basis of the positional time-variation by harmonic analysis.

12. The moving pattern determining apparatus according to claim 1 further comprising a display device comprising a characteristic value display unit which displays the moving characteristic value from the moving characteristic value calculating means, a determined result display unit which displays the result of the moving pattern determined by the moving pattern determining means; and an object display unit which displays the movement of the object.

13. A moving pattern determining apparatus comprising:

a plurality of water tanks sequentially arranged along a flowing direction, connected to each other, and keeping objects therein;

object tracking means for tracking the objects in the water tank at an upstream position and the water tank at a downstream position, and providing a positional signal indicating positions of the object;

positional time-variation calculating means for calculating positional time-variations of the objects in the water tank at the upstream and the downstream position on the basis of the positional signals from the object tracking means;

moving characteristic value calculating means for calculating moving characteristic values representing movements of the objects in the water tanks at the upstream and the downstream position on the basis of the positional time-variations provided by the positional time-variation calculating means; and moving pattern determining means for determining a moving pattern of the objects on the basis of the moving characteristic values representing the movements of the objects in the water tanks at the upstream and the downstream position.

14. The moving pattern determining apparatus according to claim 13, wherein the moving pattern determining means determines the moving pattern of the objects in all the water tanks on the basis of a difference between the characteristic value representing the movement of the object in the water tank at the upstream position, and the characteristic value representing the movement of the object in the water tank at the downstream position.

15. The moving pattern determining apparatus according to claim 13, wherein the moving pattern determining means determines the moving pattern of the object in the water tank at the upstream position on the basis of a difference between the characteristic value representing the movement of the object in the water tank at the upstream water tank and a predetermined value, and determines the moving pattern of the object in the water tank at the downstream position on the basis of a difference between the characteristic value representing the movement of the object in the water tank at the downstream position and the predetermined value.

16. The moving pattern determining apparatus according to claim 13, wherein the object tracking means is disposed on each of the water tanks at the upstream and the downstream position.

17. The moving pattern determining apparatus according to claim 13, wherein the water tank at the upstream side is provided on the outlet side thereof with a movable weir and a discharge pipe.

18. The moving pattern determining apparatus according to claim 13, wherein the water tanks are separated from each other by partition walls having return passages, respectively.

19. The moving pattern determining apparatus according to claim 13, wherein the adjacent water tanks are connected by cascading passages, respectively.

20. The moving pattern determining apparatus according to claim 13 further comprising
a display device for displaying the moving pattern of the object determined by the moving pattern determining means.

21. A moving pattern determining apparatus comprising:
wave receiving means for receiving a wave generated by an object and providing sequentially position information signals indicating positions of the object;
movement calculating means for calculating the movements of the object on the basis of the position information signals received from the wave receiving means; and
moving characteristic determining means for storing moving characteristic information about the moving characteristic of the object beforehand and determining the moving characteristic of the object on the basis of the moving characteristic information and the results of the movement of the object calculated by the movement calculating means, wherein
the moving characteristic determining means comprises:
a unit measure converting circuit which converts the movement calculated by the movement calculating means into a predetermined unit measure;
a characteristic pattern storage circuit which stores predetermined characteristic patterns as the moving characteristic information; and
a matching circuit which receives a movement converted by the unit measure converting circuit, compares the moving pattern of the object with the characteristic patterns stored in the characteristic pattern storage circuit, and provides a signal indicating the number of the characteristic pattern matched with the moving pattern of the object.

22. A moving pattern determining apparatus comprising:
stage means for being capable of optionally changing its attitude relative to an object and of receiving a wave generated by the object;
wave receiving means for being capable of sequentially providing position information signals indicating positions of the object in response to a signal corresponding to the wave generated by the object from the stage means;
stage control means for storing values of a manipulated variable for the attitude control of the stage means, corresponding to the plurality of pieces of position information, giving a control signal corresponding to a value of the manipulated variable to the stage means on the basis of the position information signal from the wave receiving means to achieve the optimum attitude control of the stage means relative to the object;
movement calculating means for receiving a displacement by which the stage means is shifted under the control of the stage control means, and calculating the movement of the object; and
moving characteristic determining means for storing moving characteristic information about the movement of the object beforehand and determining a moving characteristic of the object on the basis of the moving characteristic information and the result of the movement of the object calculated by the movement calculating means.

23. The moving pattern determining apparatus according to claim 22, wherein
the stage means is provided with a rotating mirror which receives the wave generated by the object and reflects the wave in a predetermined direction, and an angular position control means for controlling an angular position of the rotating mirror.

24. The moving pattern determining apparatus according to claim 23, wherein
the rotating mirror is a flat mirror.

25. The moving pattern determining apparatus according to claim 23, wherein
the rotating mirror is a spherical mirror.

26. The moving pattern determining apparatus according to claim 23, wherein
the stage means is provided with a spherical mirror supported on one end of a rotating shaft supported on a spherical support, receiving the wave generated by the object and reflecting the wave in a predetermined direction, a tilt actuator attached to the other end of the rotating shaft to control a first angular position of the rotating shaft in a first plane, and a pan actuator attached to the other end of the rotating shaft to control a second angular position of the rotating shaft in a second plane intersecting the first plane.

27. The moving pattern determining apparatus according to claim 22, wherein
the rotating mirror consists of two rotating mirrors respectively having axes of rotation substantially perpendicularly intersecting each other.

28. The moving pattern determining apparatus according to claim 22, wherein
the wave receiving means comprises:
a converging device which receives and converges the wave generated by the object and sent thereto from the stage means;
a wave receiving device provided with a plurality of image sensing elements which convert an image of the wave converged by the converging device into electrical signals corresponding to the intensity of the wave; and
a converting device which subjects the electrical signals given thereto by the image sensing elements of the wave receiving device to A/D conversion using a predetermined threshold and provides on/off electric signals produced by A/D conversion as the position information signals.

29. The moving pattern determining apparatus according to claim 28, wherein
the converging device is either an optical lens having fixed focal length or an optical zoom lens having adjustable focal length.

30. The moving pattern determining apparatus according to claim 28, wherein
the image sensing elements of the wave receiving device are divided into those of a first group disposed in a central region of a converging surface on which the image of the wave is converged by the converging device, and those of a second group disposed in a region of the converging surface around the central region of the converging surface in which the image sensing elements of the first group are disposed.

31. The moving pattern determining apparatus according to claim 30, wherein
the image sensing elements of the first and the second group include those which are arranged at least horizontally and vertically on the converging surface.

32. The moving pattern determining apparatus according to claim 31, wherein the stage control means is provided with a logic table of values of a manipulated variable corresponding to the results of detection made by the horizontally arranged image sensing elements and values of a manipulated variable corresponding to the results of detection made by the vertically arranged image sensing elements, and the wave receiving means determines control signals corresponding to position information signals sequentially given thereto by the wave receiving means by using the logic table.

33. The moving pattern determining apparatus according to claim 22, wherein
the stage control means is provided with a logic table of values of a manipulated variable corresponding to a plurality of pieces of position information indicating positions of the object, and control signals corresponding to position information signals sequentially given thereto by the wave receiving device are determined by using the logic table.

34. The moving pattern determining apparatus according to claim 33, wherein
the logic table further contains values of a manipulated variable for the converging device of the wave receiving means, and the stage control means controls the converging device in addition to the stage means.

35. The moving pattern determining apparatus according to claim 33, wherein
the movement calculating means calculates a movement of the moving object on the basis of an angular displacement of the rotating mirror.

36. The moving pattern determining apparatus according to claim 22, wherein
the movement calculating means calculates both a horizontal movement and a vertical movement.

37. The moving pattern determining apparatus according to claim 22, wherein
the moving characteristic determining means is provided with a display means which generates or displays an alarm when the moving characteristic determining means decides that the moving characteristic of the object is abnormal.

38. The moving pattern determining apparatus according to claim 22, wherein the wave receiving means contains image sensing elements comprising photodiodes sensitive to at least one of visible light, ultraviolet light, infrared light and laser light.

39. The moving pattern determining apparatus according to claim 22, wherein
the moving characteristic determining means comprises:
a unit measure converting circuit which converts the movement calculated by the movement calculating means into a predetermined unit measure;
a characteristic pattern storage circuit which stores predetermined characteristic patterns as the moving characteristic information; and
a matching circuit which receives a movement converted by the unit measure converting circuit, compares the moving pattern of the object with the characteristic patterns stored in the characteristic pattern storage circuit, and provides a signal indicating the number of the characteristic pattern matched with the moving pattern of the object.

40. The moving pattern determining apparatus according to claim 39, wherein
the unit measure converting circuit calculates the geometric mean $\Delta z$ of a horizontal displacement $\Delta x$ of the object and a vertical displacement $\Delta y$ of the object as a unit measure.

41. The moving pattern determining apparatus according to claim 39, wherein
the unit measure converting circuit calculates the ratio $\Delta R$ between a horizontal displacement $\Delta x$ of the object and a vertical displacement $\Delta y$ of the object as a unit measure.

42. The moving pattern determining apparatus according to claim 39, wherein
the unit measure converting circuit calculates the differences $\nabla x$ and $\nabla y$ between two successive horizontal displacements $\Delta x$ of the object and between two successive vertical displacements $\Delta y$ of the object as the unit measure.

43. The moving pattern determining apparatus according to claim 39, wherein
the unit measure converting circuit calculates the difference geometric mean $\nabla z$ of the respective differences $\nabla x$ and $\nabla y$ between two successive horizontal displacements $\Delta x$ of the object and between two successive vertical displacements $\Delta y$ of the object as the unit measure.

44. The moving pattern determining apparatus according to claim 39, wherein
the unit measure converting circuit calculates the geometric mean $\Delta E$ of the two differences between three successive calculated horizontal displacements $\Delta x$ of the object and the two differences between three successive calculated vertical displacements $\Delta y$ of the object as the unit measure.

45. The moving pattern determining apparatus according to claim 39, wherein
the characteristic pattern storage circuit stores, as the characteristic patterns, a plurality of logical expressions which express values in a region between a predetermined upper limit and a predetermined lower limit which are defined by the unit measure calculated by the unit measure converting circuit in positive values, and expresses values outside the region in negative values, and the matching circuit decides whether or not a calculated value calculated by the unit measure converting circuit is applicable to the logical expression, and provides the contents of the logical expression as a moving characteristic.

46. The moving pattern determining apparatus according to claim 28, wherein
the converting device comprises:
an analog amplifying circuit for amplifying an electric signal received from the wave receiving device; and
an A/D converter provided with an input terminal to which a predetermined threshold specifying a lower limit for an amplified electric signal provided by the analog amplifying circuit can be applied.

47. A moving pattern determining apparatus comprising:
wave receiving means for receiving a wave generated by an object and providing sequentially position information signals indicating positions of the object;
movement calculating means for calculating the movements of the object on the basis of the position information signals received from the wave receiving means; and
moving characteristic determining means for storing moving characteristic information about the moving characteristic of the object beforehand and determining the moving characteristic of the object on the basis of the moving characteristic information and the results of the movement of the object calculated by the movement calculating means, wherein the wave receiving means comprises:
- a converging device for receiving and converging a wave from the object;
- a wave receiving device having horizontal and vertical rows, each including a plurality of image sensing elements which convert an image of the wave converged by the converging device into electrical signals of intensities corresponding to the intensities of the wave; and
- a converter which receives the electrical signals from the horizontal and the vertical row of image sensing elements and provides as the position information signal, a position of the image sensing element which provides the electrical signal corresponding to the highest wave intensity, and wherein the movement calculating means calculates a direction from which the wave generated by the object is received and a movement of the object on the basis of the number of movements per unit time of the image sensing elements which provide electrical signals corresponding to the highest wave intensity among the horizontal and the vertical row of the image sensing elements.

* * * * *